United States Patent [19]

Ichinoi et al.

[11] Patent Number: 4,626,929

[45] Date of Patent: Dec. 2, 1986

[54] COLOR VIDEO SIGNAL RECORDING AND REPRODUCING APPARATUS

[75] Inventors: Yutaka Ichinoi, Yokohama; Naomichi Nishimoto, Tachikawa, both of Japan

[73] Assignee: Victor Company of Japan, Ltd., Japan

[21] Appl. No.: 588,380

[22] Filed: Mar. 12, 1984

[30] Foreign Application Priority Data

Mar. 15, 1983 [JP] Japan .................................. 58-42660
Mar. 15, 1983 [JP] Japan .................................. 58-42661
Mar. 18, 1983 [JP] Japan .................................. 58-45747

[51] Int. Cl.⁴ ...................... H04N 9/493; H04N 5/76
[52] U.S. Cl. .................................... 358/310; 358/320
[58] Field of Search ................. 358/310, 314, 327, 11, 358/12, 14, 15, 21 R, 142, 335, 340, 336; 360/33.1, 38.1

[56] References Cited

U.S. PATENT DOCUMENTS 3,717,725  2/1973  Numakura .
3,781,463  12/1973  Bussche .............................. 358/320
4,245,235  1/1980  Poetsch .................................. 358/14

FOREIGN PATENT DOCUMENTS

81/03098  10/1981  PCT Int'l Appl. .

OTHER PUBLICATIONS

Fernseh–und Kinotechnik, 1980, No. 12, pp. 451–458.

Primary Examiner—Robert L. Richardson

Attorney, Agent, or Firm—Andrus, Sceales, Starke & Sawall

[57] ABSTRACT

A color video signal recording and reproducing apparatus comprises a circuit for separating a luminance signal and a carrier chrominance signal from a color video signal, a first compressing circuit for time base compressing the luminance signal by use of a RAM, a second compressing circuit for time base compressing a line-sequential color difference signal obtained from the carrier chrominance signal by use of a RAM, a circuit for producing a discriminating signal, a circuit for time-division-multiplexing signals obtained by subjecting output digital signals of the first and second compressing circuits to a digital-to-analog conversion and the discriminating signal to produce a time-division-multiplexed signal, a circuit for recording the time-division-multiplexed signal on a recording medium and reproducing the recorded signal to obtain a reproduced time-division-multiplexed signal, first expanding circuit for obtaining a digital luminance signal in an original time base by use of a RAM from the reproduced time-division-multiplexed signal, a second expanding circuit for obtaining a digital line-sequential color difference signal in an original time base by use of a RAM from the reproduced time-division-multiplexed signal, and a circuit for obtaining a reproduced luminance signal and a reproduced line-sequential color difference signal by subjecting the output digital signals of the first and second expanding circuits to a digital-to-analog conversion.

10 Claims, 54 Drawing Figures

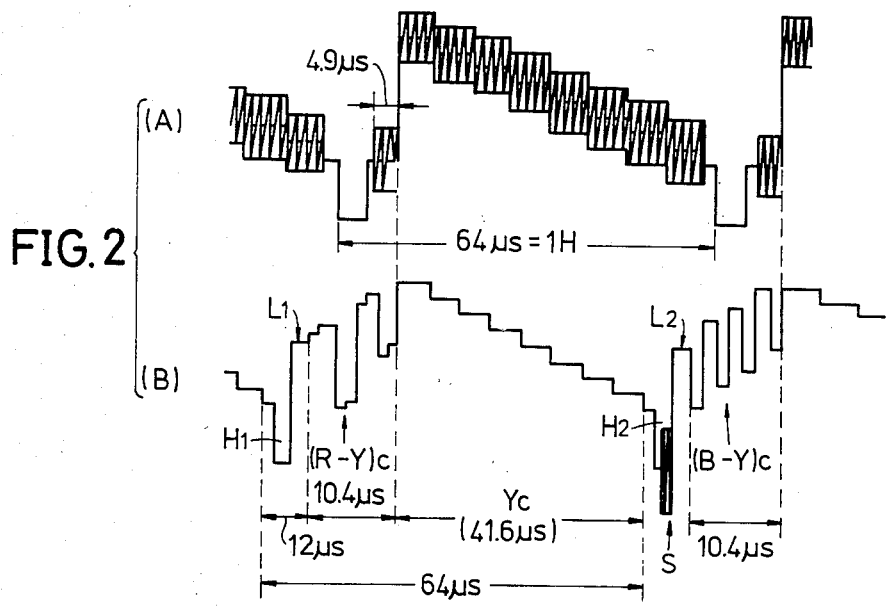
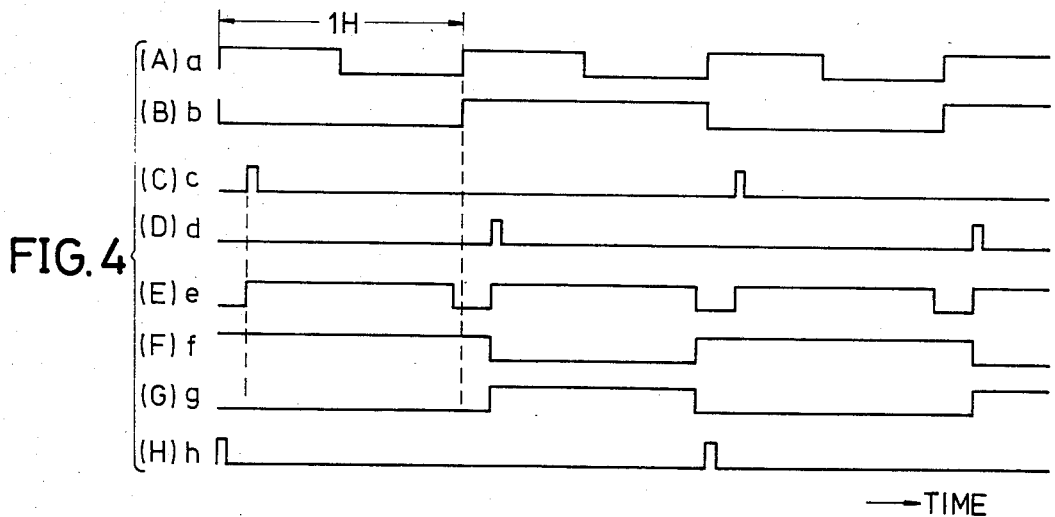

COLOR VIDEO SIGNAL RECORDING AND REPRODUCING APPARATUS

BACKGROUND OF THE INVENTION

The present invention generally relates to color video signal recording and reproducing apparatuses, and more particularly to a color video signal recording and reproducing apparatus in which a luminance signal and two kinds of color difference signals of a color video signal are respectively subjected to a time base compression by use of a digital memory and thereafter time-division-multiplexed, a frequency modulated signal which is obtained by frequency-modulating the time division multiplexed signal is recorded on a recording medium, and a frequency modulated signal which is reproduced from the recording medium is frequency-demodulated and then subjected to a time base expansion to the original time base by use of the digital memory to obtain a reproduced color video signal.

Among the existing color video signal recording and reproducing apparatuses such as video tape recorders (VTRs), the more popular recording and reproducing apparatuses separate a luminance signal and a carrier chrominance signal from a standard system composite color video signal. The standard system is a system such as the NTSC system, the PAL system, and the SECAM system. The separated luminance signal is frequency-modulated, and the separated carrier chrominance signal is frequency-converted into a low frequency range. The frequency converted carrier chrominance signal is frequency-division-multiplexed with the frequency modulated luminance signal and recorded on a recording medium. At the time of the reproduction, a signal processing opposite to the signal processing carried out at the time of the recording, is carried out to obtain a reproduced composite color video signal which is in conformance with the original standard system. In other words, the more popular recording and reproducing apparatuses employ the so-called low-band-conversion recording and reproducing system.

Other various recording and reproducing systems have been proposed besides the low-band-conversion recording and reproducing system. For example, there was a proposed recording and reproducing apparatus which was designed to subject two kinds of color difference signals which are obtained by frequency-demodulating the carrier chrominance signal to a time base compression, and also subject the luminance signal to a time base compression. According to this proposed recording and reproducing apparatus, the time base compressed signals are time-division-multiplexed, and the time division multiplexed signal is frequency-modulated and recorded on the recording medium. At the time of the reproduction, a signal processing opposite to the signal processing carried out at the time of the recording, is carried out to obtain a reproduced composite color video signal which is in conformance with the original standard system. An example of such a recording and reproducing apparatus may be found in the U.S. Pat. Nos. 3,781,463 and 4,245,235, for example. This proposed recording and reproducing apparatus takes into account the difference in the bands of the luminance signal and the color difference signals, and takes measures so that the color difference signals having the narrower band can be transmitted within the horizontal blanking period. In other words, one of the color difference signals which is transmitted within one horizontal scanning period (1 H), is subjected to a time base compression into approximately 20% of 1 H. In addition, to utilize the band effectively, the luminance signal is subjected to a time base compression into approximately 80% of 1 H so as to occupy a band which is in the same range as the band of the time base compressed color difference signal, and transmitted. Further, the two color difference signals are time-division-multiplexed, as a line-sequential signal in which the two color difference signals are alternately transmitted for every 1 H, with the time base compressed luminance signal. This time-division-multiplexed signal is supplied to a frequency modulator, and an output signal of the frequency modulator is recorded on the recording medium. At the time of the reproduction, a signal processing opposite to the signal processing carried out at the time of the recording, is carried out to obtain a reproduced composite color video signal. The recording and reproducing system employed in this proposed recording and reproducing apparatus, will hereinafter be referred to as a timeplex system.

According to the timeplex system which transmits the time-division-multiplexed signal, there is no duration in which the luminance signal and the color difference signal are transmitted simultaneously. In the case of the NTSC system color video signal and the PAL system color video signal, a mutual interference and moire may occur between the luminance signal and the color difference signals, because the luminance signal and the carrier chrominance signal are band-share-multiplexed and transmitted. However, such a mutual interference and moire will not occur according to the timeplex system. In addition, even when the color video signal of any one of the NTSC system, the PAL system, and the SECAM system is recorded by an azimuth recording and reproducing system on tracks having the horizontal synchronizing signals recorded in non-alignment between mutually adjacent tracks and then reproduced, there is substantially no crosstalk from the adjacent tracks due to the azimuth loss effect, and it is possible to obtain a reproduced picture of a high picture quality. This is because the time-division-multiplexed signal is recorded on the adjacent tracks in the form of a frequency modulated signal which is obtained by frequency-modulating by the time-division-multiplexed signal a high-frequency carrier which has a large azimuth loss effect.

The time base compressed luminance signal and the time base compressed color difference signal employed in the timeplex system, both have an energy distribution in which the energy is large in the low frequency range and the energy is small in the high frequency range. In other words, the time base compressed luminance signal and the time base compressed color difference signal assume a signal format which is suited for the frequency modulation. Thus, it is possible to obtain a large modulation index, and the signal-to-noise ratio can be greatly improved. Moreover, it is possible to substantially eliminate a deviation in the reproducing time base when expanding the time base.

The conventional recording and reproducing apparatus employing the timeplex system, used an analog memory such as a charge transfer element for carrying out the time base compression and the time base expansion. Consequently, each starting point of the time base compression or the time base expansion of the input signal could not be clearly determined, and it was impossible to compensate for the deviation in the reproducing time base (jitter) in a satisfactory manner. In addition, there was a problem in that the picture quality of the reproduced picture became deteriorated because the analog memory itself has a frequency characteristic in which a flat characteristic portion is relatively narrow.

Especially when recording and reproducing the SECAM system color video signal according to the timeplex system, the carrier chrominance signal in the SECAM system color video signal is a line-sequential signal in which a first frequency modulated signal obtained by frequency-modulating a first carrier by a color difference signal (R−Y) and a second frequency modulated signal obtained by frequency-modulating a second carrier by a color difference signal (B−Y) are alternately time-sequentially multiplexed for every 1 H, as is well known, and the color difference signals (R−Y) and (B−Y) which are obtained by frequency-demodulating the above carrier chrominance signal are naturally in the form of a line-sequential color difference signal. For this reason, when recording the SECAM system color video signal by the conventional recording and reproducing apparatus, the frequency demodulated line-sequential color difference signal was passed through a circuit which simultaneously obtained the color difference signals (R−Y) and (B−Y), and then the color difference signals were supplied to a switching circuit part which produced the above line-sequential color difference signal. On the other hand, at the time of the reproduction, the reproduced line-sequential color difference signal was supplied to a circuit part made up from two switches and a 1 H delay circuit for simultaneously obtaining the two kinds of color difference signals, and then the color difference signals were supplied to a circuit part which produced the line-sequential color difference signal. Therefore, there was a problem in that the circuit construction became unnecessarily complex.

Further, when dubbing the color video signal according to the timeplex system, the color video signal passes through the recording system and the reproducing system of one recording and reproducing apparatus, and then passes through the recording system of another recording and reproducing system to be recorded on a magnetic tape, for example. In this case, the color video signal passes through a plurality of filter, frequency modulators, and frequency demodulators, and also passes through the time base compressing system and the time base expanding system. As a result, the frequency characteristic, the pulse characteristic, the linearity, and the like became deteriorated, and there was a problem in that a reproduced picture obtained from the dubbed color video signal had a deteriorated picture quality.

SUMMARY OF THE INVENTION

Accordingly, it is a general object of the present invention to provide a novel and useful color video signal recording and reproducing apparatus in which the problems described heretofore have been eliminated.

Another and more specific object of the present invention is to provide a color video signal recording and reproducing apparatus comprising first time base compressing means, second time base compressing means, time-division-multiplexing means, recording means, reproducing means, first time base expanding means, second time base expanding means, and reproduced signal obtaining means. The first time base compressing means employs a random access memory (RAM) to perform a time base compression with respect to a signal which is obtained by subjecting a luminance signal to an analog-to-digital conversion. The second time base compressing means employs a RAM to perform a time base compression with respect to a signal which is obtained by subjecting a line-sequential color difference signal to an analog-to-digital conversion, in which line-sequential color difference signal two kinds of color difference signals are time-sequentially multiplexed. Output digital signals of the first and second time base compressing means are supplied to the time-division-multiplexing means. The time-division-multiplexing means performs a time-division-multiplexing so that the two kinds of time base compressed color difference signals alternately exist for each one horizontal scanning period, and so that one of the time base compressed color difference signals and the time base compressed luminance signal exist in one horizontal scanning period. The recording means frequency-modulates a time-division-multiplexed signal from the time-division-multiplexing means, and records the frequency modulated time-division-multiplexed signal on a recording medium. The reproducing means frequency-demodulates the frequency modulated time-division-multiplexed signal which is reproduced from the recording medium, and obtains a reproduced time-division-multiplexed signal. The first time base expanding means employs a RAM to perform a time base expansion to an extent which is in agreement with the time base compression performed in the first time base compressing means. The first time base expanding means performs the time base expansion with respect to a digital time base compressed luminance signal, between the digital time base compressed luminance signal and a digital time base compressed line-sequential color difference signal which are obtained by subjecting the reproduced time-division-multiplexed signal to an analog-to-digital conversion, and obtains a reproduced digital luminance signal. The second time base expanding means employs a RAM to perform a time base expansion to an extent which is in agreement with the time base compression performed in the second time base compressing means. The second time base expanding means performs the time base expansion with respect to the digital time base compressed line-sequential color difference signal, and obtains a reproduced digital line-sequential color difference signal. The reproduced signal obtaining means subjects both output digital signals of the first and second time base expanding means to a digital-to-analog conversion, and obtains a reproduced luminance signal and a reproduced line-sequential color difference signal.

According to the apparatus of the present invention, it is possible to accurately determine the starting timing positions for the compression and expansion of the time base, and it is possible to compensate for a deviation in the reproducing time base (jitter). Moreover, because the compression and expansion of the time base are performed by converting the signals to digital signals, it is possible to design pre-emphasis and de-emphasis circuits to process digital signals, and in this case, these circuits may be disposed within a single integrated circuit (IC). The picture quality can be improved according to the needs, by appropriately improving the resolution of an analog-to-digital converter. In addition, the picture quality can be improved since there is no limit to the band as in the case where an analog memory is employed. By sampling and holding a D.C. level of an achromatic color part in a line-sequential color difference signal which is obtained by frequency-demodulating a carrier chrominance signal of a SECAM system color video signal at the time of the recording, and not performing a time base compression with respect to the D.C. level of the achromatic color part in the line-sequential color difference signal, the memory capacity of the RAM which is required can be greatly reduced compared to a case where the time base compression is also performed with respect to the achromatic color part in the line-sequential color difference signal. Furthermore, it is possible to transmit the D.C. level of the achromatic color part in the line-sequential color difference signal with a high precision, without introducing an error which would occur when the D.C. level of the achromatic color part in the line-sequential color difference signal is processed digitally.

Still another object of the present invention is to provide a color video signal recording and reproducing apparatus in which the time base compression is performed at the time of the recording with respect to the line-sequential color difference signal which is obtained by frequency-demodulating the carrier chrominance signal of the SECAM system color video signal, without simultaneously obtaining the color difference signals from the line-sequential color difference signal, and a reproduced carrier chrominance signal which is in conformance with the SECAM system is obtained at the time of the reproduction by frequency-modulating a reproduced line-sequential color difference signal which is obtained by performing the time base expansion, without simultaneously obtaining the color difference signals from the reproduced line-sequential color difference signal.

According to the apparatus of the present invention, it is possible to simplify the circuit construction compared to the circuit construction of the conventional SECAM color video signal recording and reproducing apparatus. In addition, in a case where the recording and reproduction are carried out by maintaining a relative D.C. level difference between the color difference signals (R−Y) and (B−Y) of the achromatic color part (a demodulated signal component obtained by demodulating a non-modulated carrier which is transmitted within a specific duration within the back porch) in the line-sequential color difference signal which is obtained by the frequency demodulation, the circuit construction can be made more simple, and the manufacturing cost of the circuit can be reduced.

A further object of the present invention is to provide a color video signal recording and reproducing apparatus comprising replacing means, a frequency modulator, and recording means. The replacing means replaces a horizontal synchronizing signal and a discriminating signal which is used to discriminate the two kinds of color difference signal, which are within the reproduced time-division-multiplexed signal which is reproduced from the recording medium, by a horizontal synchronizing signal and a discriminating signal which are produced independently. A reproduced time-division-multiplexed signal in which the horizontal synchronizing signal and the discriminating signal have been replaced by the replacing means, is frequency-modulated in the frequency modulator. The recording means records output signal of the frequency modulator on an unrecorded recording medium.

According to the apparatus of the present invention, it is possible to reduce the number of times the color video signal which is to be dubbed must pass through a filter, be subjected to frequency modulation and demodulation, and the like. In addition, the number of times the color video signal which is to be dubbed must pass through a time base compressing circuit and a time base expanding circuit, can respectively be reduced by one. As a result, the color video signal can be dubbed in the time-division-multiplexed signal format, with a higher quality compared to the case of the conventional dubbing. The horizontal synchronizing signal and the discriminating signal will become deteriorated during the recording and reproducing process. Thus, in a case where the reproduced picture is obtained from the time-division-multiplexed signal having the deteriorated horizontal synchronizing signal and the deteriorated discriminating signal, a color irregularity will occur at the contours of the images in the reproduced picture. However, according to the apparatus of the present invention, such a color irregularity can be prevented from occurring in the reproduced picture, because the deteriorated horizontal synchronizing signal and the deteriorated discriminating signal are respectively replaced by the independently produced horizontal synchronizing signal and the discriminating signal in the replacing means. Further, according to the present invention, a color irregularity due to the deviation in the reproducing time base can be prevented from occurring, because the time base expanding circuit for the time base compressed luminance signal is used to eliminate the deviation in the reproducing time base of the reproduced time-division-multiplexed signal.

Other objects and further features of the present invention will be apparent from the following detailed description when read in conjunction with the accompanying drawings.

BRIEF DESCRIPTION OF THE DRAWINGS

FIGS. 2(A) and 2(B) respectively show signal waveforms for explaining the operation of the block system shown in FIG. 1;

FIGS. 4(A) through 4(H) respectively show signal waveforms for explaining the operation of the block system shown in FIG. 3;

DETAILED DESCRIPTION

Figure 1:
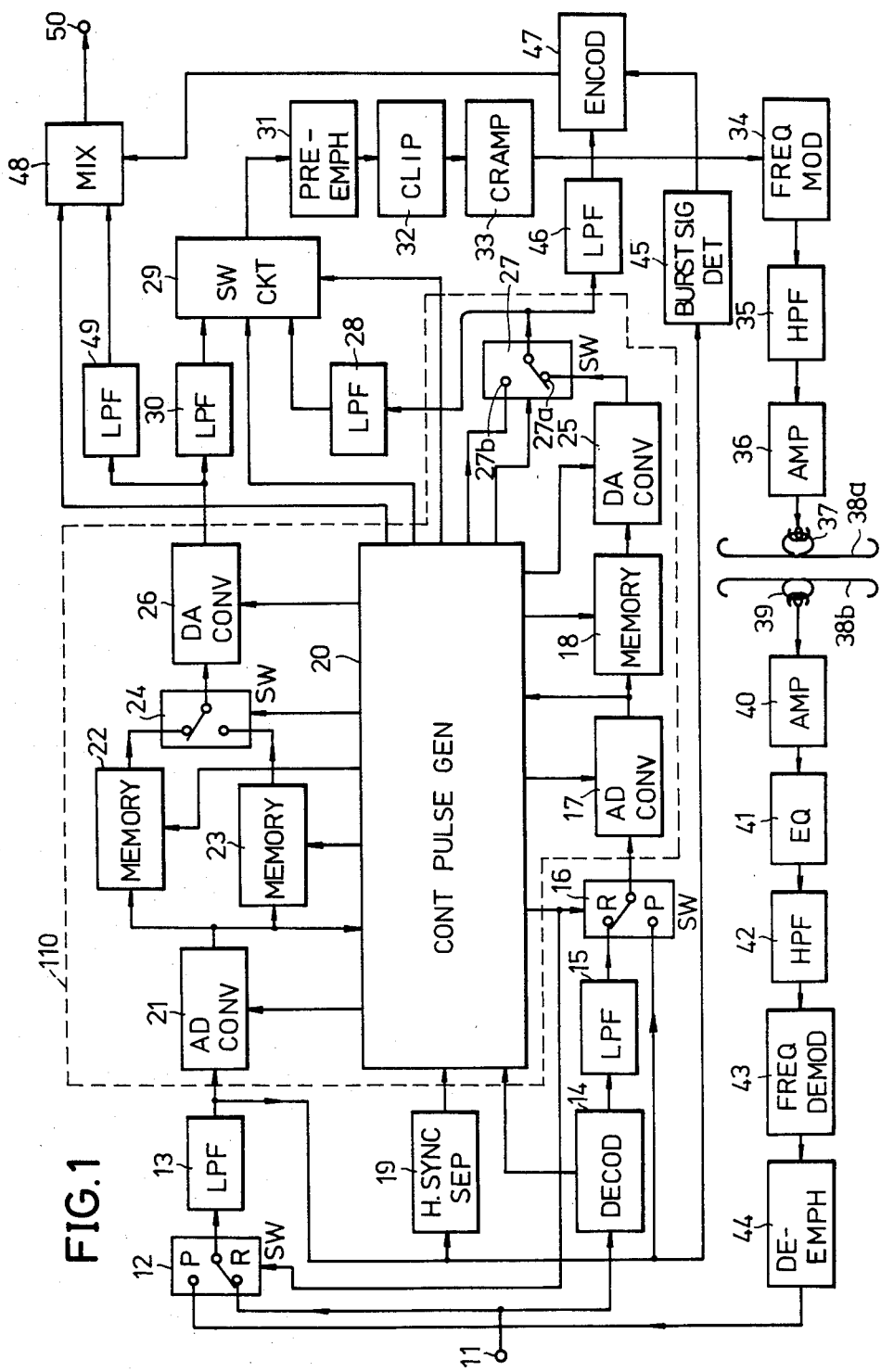
FIG. 1 is a systematic block diagram showing a first embodiment of a color video signal recording and reproducing apparatus according to the present invention.

First, description will be given with respect to the operation of a first embodiment of a color video signal recording and reproducing apparatus according to the present invention, at the time of the recording, by referring to FIG. 1. In FIG. 1, a SECAM system color video signal, for example, is applied to an input terminal 11. This color video signal is supplied to a lowpass filter 13 through a switching circuit 12 which is connected to a terminal R, and a luminance signal is separated in the lowpass filter 13. On the other hand, the color video signal is also supplied to a decoder 14 wherein a carrier chrominance signal is frequency-selected and then demodulated into a line-sequential color difference signal, as will be described later on in the specification.

In the line-sequential color difference signal, there is a predetermined difference between the D.C. level of an achromatic color part (non-modulated carrier part) having a width of 4.9 $\mu$s and located in a back porch within one horizontal scanning period (1 H) in which a color difference signal (B−Y) is transmitted, and the D.C. level of an achromatic color part (non-modulated carrier part) having a width of 4.9 $\mu$s and located in a back porch within 1 H in which a color difference signal (R−Y) is transmitted. This is because a chrominance subcarrier frequency of the carrier chrominance signal is 4.25 MHz in the transmission line of the color difference signal (B−Y), and a chrominance subcarrier frequency of the carrier chrominance signal in the transmission line of the color difference signal (R−Y) is different from 4.25 MHz and is 4.406 MHz. The line-sequential color difference signal is subjected to a D.C. level shift, so that the D.C. level of the achromatic color part of one color difference signal coincides with the D.C. level of the achromatic color part of the other color difference signal, before being supplied to an analog-to-digital (AD) converter 17 through a lowpass filter 15 and a switching circuit 16. An output signal of the AD converter 17, is supplied to a memory circuit 18.

On the other hand, the luminance signal which is separated from the input SECAM system color video signal, is obtained from the lowpass filter 13. This luminance signal is supplied to a horizontal synchronizing signal separating circuit 19 wherein a horizontal synchronizing signal is separated. The separated horizontal synchronizing signal from the horizontal synchronizing signal separating circuit 19 is supplied to a control pulse generating device 20, together with a pulse which is obtained from a part of the decoder 14. The luminance signal from the lowpass filter 13 is also supplied to an AD converter 21 wherein the luminance signal is subjected to an analog-to-digital conversion. An output signal of the AD converter 21 is supplied to memory circuits 22 and 23. As will be described later on in the specification, the memory circuits 18, 22, and 23 are each made up from a random access memory (RAM) and an address counter. Output digital signals of the AD converters 17 and 21 are supplied to the control pulse generating device 20. As will be described in detail later on in the specification, the control pulse generating device 20 generates various control pulses, and supplies the control pulses to the AD converters 17 and 21, the switching circuits 16, 24, 27, and 29, and digital-to-analog (DA) converting circuits 25 and 26. In addition, the control pulse generating device 20 generates a write-in clock pulse and a read-out clock pulse with a predetermined timing and with a predetermined repetition frequency, and supplies these write-in and read-out clock pulses to the memory circuits 18, 22, and 23.

In other words, the control pulse generating device 20 supplies a write-in clock pulse of 8 MHz, for example, to one of the memory circuits 22 and 23, so as to write into the one of the memory circuits 22 and 23 a luminance signal which corresponds to a duration of 1 H and is transmitted within a video duration of 52 $\mu$s. At the same time, the control pulse generating device 20 supplies a read-out clock pulse of 10 MHz, for example, to the other of the memory circuits 22 and 23 immediately after the transmission of a time base compressed color difference signal corresponding to 1 H (52 $\mu$s) is completed, so as to read out from the other of the memory circuits 22 and 23 a stored luminance signal which corresponds to 1 H and was transmitted 1 H before. The read-out clock pulse is supplied to the other of the memory circuits 22 and 23 for a duration which excludes from the duration of 1 H a serial transmission period in which the horizontal synchronizing signal and the time base compressed color difference signal are transmitted. The read-out operation and the write-in operation with respect to the memory circuits 22 and 23, are alternately carried out for every 1 H. In addition, the switching circuit 24 which is coupled to output sides of the memory circuits 22 and 23, is switched over in response to a control pulse from the control pulse generating device 20 so as to selectively pass an output signal of the memory circuit 22 or 23 which is carrying out the read-out operation. As a result, a luminance signal which has been time base compressed to 4/5, is intermittently obtained from the switching circuit 24 without a dropout of information. This time base compressed luminance signal from the switching circuit 24, is subjected to a digital-to-analog conversion in the DA converting circuit 26.

On the other hand, the line-sequential color difference signal which is produced from the switching circuit 16, is subjected to an analog-to-digital conversion in the AD converter 17 before being supplied to the memory circuit 18. The line-sequential color difference signal which is transmitted in a video duration of 52 μs within 1 H (=64 μs), is written into the memory circuit 18 in response to a write-in clock pulse of 2 MHz, for example, which write-in clock pulse is received from the control pulse generating device 20. After a predetermined duration (1.6 μs, for example) from the time when this write-in operation is completed, a color difference signal which has been time base compressed to 1/5 is read out from the memory circuit 18 in response to a read-out clock pulse of 10 MHz, for example, which read-out clock pulse is received from the control pulse generating device 20. In this case, one read-out duration lasts for 10.4 μs.

The time base compressed line-sequential color difference signal from the memory circuit 18, is subjected to a digital-to-analog conversion in the DA converting circuit 25 before being supplied a terminal 27a of the switching circuit 27. A D.C. level of the achromatic color part in the line-sequential color difference signal, which has been sampled and held in the control pulse generating device 20, is applied to a terminal 27b of the switching circuit 27. The switching of the switching circuit 27 is controlled by an output pulse of the control pulse generating device 20, so that the switching circuit 27 is switched over and connected to the terminal 27a immediately after the duration in which the D.C. level (color reference level) is applied to the terminal 27b ends. Thus, the switching circuit 27 selectively produces a signal in which the output time base compressed line-sequential color difference signal of the DA converting circuit 25 is time-division-multiplexed, immediately after the color reference level, and supplies this selectively produced signal to the switching circuit 29 through a lowpass filter 28. As will be described later on in the specification, the DA converting circuits 25 and 26 each comprises a latch gate and a DA converter coupled thereto.

The switching circuit 29 is supplied with the time base compressed luminance signal from the DA converting circuit 26, through a lowpass filter 30. Further, the switching circuit 29 is also supplied with a multiplexed signal including the horizontal synchronizing signal having a width of approximately 4 μs and a discriminating burst signal. This multiplexed signal is generated in the control pulse generating device 20, from the horizontal synchronizing signal and the discriminating burst signal which are generated in the control pulse generating device 20. The discriminating burst signal is used to discriminate the transmission lines of the color difference signals (B−Y) and (R−Y). For example, the discriminating burst signal has a single frequency of 1.6 MHz, for example, and is generated in the transmission line of only one (the color difference signal (R−Y) in this case) of the color difference signals (B−Y) and (R−Y), in correspondence with the duration in which the horizontal synchronizing signal is generated.

The switching of the switching circuit 29 is controlled by a pulse from the control pulse generating device 20. Accordingly, the switching circuit 29 produces a time-division-multiplexed signal in which the multiplexed signal from the control pulse generating device 20, the output signal of the lowpass filter 28, and the output signal of the lowpass filter 30 are time-division-multiplexed in sequence within a duration of 1 H. In other words, in a duration of a certain 1 H, the output signal of the switching circuit 29 is a time-division-multiplexed signal including the horizontal synchronizing signal from the control pulse generating device 20, the output signal of the lowpass filter 28, and the output signal of the lowpass filter 30. On the other hand, in a duration of 1 H which is immediately subsequent to the certain 1 H, the output signal of the switching circuit 29 is a time-division-multiplexed signal including the multiplexed signal from the control pulse generating device 20, the output signal of the lowpass filter 28, and the output signal of the lowpass filter 30, where the horizontal synchronizing signal and the discriminating burst signal generated in the control pulse generating device 20 are multiplexed in the multiplexed signal from the control pulse generating device 20.

When a SECAM system color video signal in the form of a color bar signal shown in FIG. 2(A) is applied to the input terminal 11, a time-division-multiplexed signal shown in FIG. 2(B) is produced from the switching circuit 29. As shown in FIG. 2(B), a discriminating burst signal S is multiplexed with a horizontal synchronizing signal $H_2$ for every 1 H (=64 μs). In the time-division-multiplexed signal shown in FIG. 2(B), horizontal synchronizing signals $H_1$ and $H_2$, color reference levels $L_1$ and $L_2$ (the D.C. level of the achromatic color part of the respective color difference signals), the time base compressed color difference signals $(R-Y)_C$ and $(B-Y)_C$, and a time base compressed luminance signal $Y_C$, and the time base compressed luminance signal $Y_C$ is transmitted line-sequentially. This time-division-multiplexed signal shown in FIG. 2(B) is passed through a known recording signal processing circuit in a video tape recorder (VTR), and recorded on a magnetic tape 38a by a recording head 37. The recording signal processing circuit comprises a pre-emphasis circuit 31, a white peak level clipping circuit 32, a clamping circuit 33, a frequency modulator 34, a highpass filter 35, and a recording amplifier 36.

Next, description will be given with respect to the operation of the apparatus shown in FIG. 1 at the time of the reproduction. At the time of the reproduction, the switching circuits 12 and 16 are connected to respective terminals P. A reproducing head 39 reproduces from a magnetic tape 38b, a signal which is identical to the signal which was recorded on the magnetic tape 38a at the time of the recording. The frequency modulated signal which is reproduced by the reproducing head 39, is passed through a known reproduced signal processing circuit, and formed into a reproduced time-division-multiplexed signal shown in FIG. 2(B). The reproduced signal processing circuit comprises a reproducing amplifier 40, an equalizer 41, a highpass filter 42, a frequency demodulator 43, and a de-emphasis circuit 44. The reproduced time-division-multiplexed signal is passed through the switching circuit 12 which is connected to the terminal P, and the lowpass filter 13. The output signal of the lowpass filter 13 is supplied to the AD converter 21, the horizontal synchronizing signal separating circuit 19, and a discriminating burst signal detector 45. The output signal of the lowpass filter 13 is also supplied to the AD converter 17, through the switching circuit 16 which is connected to the terminal P. A circuit part which is made up from the AD converter 21, the memory circuits 22 and 23, the switching circuit 24, and the DA converting circuit 26, carries out a time base expansion based on output signals of the control pulse generating device 20 so as to produce a reproduced luminance signal which has been returned to its original time base. As in the case at the time of the recording, when one of the memory circuits 22 and 23 carries out a write-in operation with respect to the time base compressed luminance signal of the reproduced time-division-multiplexed signal, the other of the memory circuits 22 and 23 carries out the read-out operation. Further, the memory circuits 22 and 23 alternately carry out the read-out operation and the write-in operation for every 1 H. However, unlike at the time of the recording, the repetition frequency of the write-in clock pulse is 10 MHz, for example, and the repetition frequency of the read-out clock pulse is 8 MHz, for example. Accordingly, a reproduced luminance signal which has been time base expanded to 5/4 (that is, time base expanded to the extent the time base compression was performed at the time of the recording), is alternately produced from the memory circuits 22 and 23 for every 1 H.

On the other hand, a circuit part which is made up from the AD converter 17, the memory circuit 18, and the DA converting circuit 25, writes the time base compressed color difference signal within the reproduced time-division-multiplexed signal in the memory circuit 18 based on the output signals of the control pulse generating device 20 and thereafter carries out a read-out operation, so as to obtain a line-sequential color difference signal which has been returned to its original time base. In other words, the digital signal of the reproduced time base compresses color difference signal is written in the memory circuit 18 by a write-in clock pulse of 10 MHz, for example, and a digital signal of a preproduced line-sequencential color difference signal which has been returned to its original time base by expanding the time base to 5 times, is read out from the memory circuit 18 by a read-out clock pulse of 2 MHz. The digital signal which is read out from the memory circuit 18, is converted into a reproduced line-sequential color difference signal in the DA converting circuit 25. This reproduced line-sequential color difference signal from the DA converting circuit 25, is applied to the terminal 27a of the switching circuit 27. A color reference level (indicated by L$_1$ and L$_2$ in FIG. 2(B)) which is obtained in the control pulse generating device 20 by sampling and holding, is applied to the terminal 27b of the switching circuit 27. At the time of the reproduction, the switching circuit 27 is connected to the terminal 27b for the duration of 10.4 μs in which the time base compressed color difference signal is transmitted, and is otherwise switched over and connected to the terminal 27a. As a result, the switching circuit 27 produces a reproduced line-sequential color difference signal which has been returned to its original time base and in which the color reference level has been added. This reproduced line-sequential color difference signal from the switching circuit 27 is supplied to a first input terminal of an encoder 47, through a lowpass filter 46. The discriminating burst signal of 1.6 MHz described before, is detected in the discriminating burst signal detector 45, and the output signal of the discriminating burst signal detector 45 is supplied to a second input terminal of the encoder 47.

The encoder 47 gives a predetermined D.C. level difference between the color difference signals (R−Y) and (B−Y) of the reproduced line-sequential color difference signal, before performing a frequency modulation to obtain a frequency modulated signal. Further, the encoder 47 transmits this frequency modulated signal only for a duration which excludes a predetermined duration of the frequency modulated signal. In other words, the encoder 47 transmits the frequency modulated signal for a duration which excludes the duration of the horizontal synchronizing signal, the durations in the vicinity of the horizontal synchronizing signal, and the like, to produce a frequency modulated signal which is a carrier chrominance signal in conformance with the SECAM system.

The reproduced carrier chrominance signal which is in conformance with the SECAM system and is obtained from an output terminal of the encoder 47, is supplied to a mixing circuit 48 shown in FIG. 1. This reproduced carrier chrominance signal, the reproduced luminance signal which is obtained from the DA converting circuit 26 through a lowpass filter 49, and synchronizing signals from the control pulse generating device 20, are respectively mixed in the mixing circuit 48. As a result, a reproduced color video signal in conformance with the SECAM system, is produced from the mixing circuit 48 through an output terminal 50.

Thus, according to the present embodiment of the invention, at the time of the recording, the line-sequential color difference signal which is frequency-modulated after being separated from the SECAM system color video signal, is passed through the AD converter 17 and then subjected to the time base compression by use of the memory circuit 18. On the other hand, the luminance signal is passed through the AD converter 21 and then subjected to the time base compression by use of the memory circuits 22 and 23. At the time of the reproduction, the relation between the write-in clock pulse and the read-out clock pulse is selected to a relation which is opposite to the relation at the time of the recording, so as to perform the time base expansion by similar circuits. Therefore, it is possible to accurately determine the operation starting point of the time base compression and the time base expansion for every 1 H. In addition, by setting the frequency of the read-out clock pulse to a constant frequency having no time base deviation, it is possible to eliminate the deviation in the reproducing time base (jitter) at the same time as when the time base expansion is performed.

Figure 3:
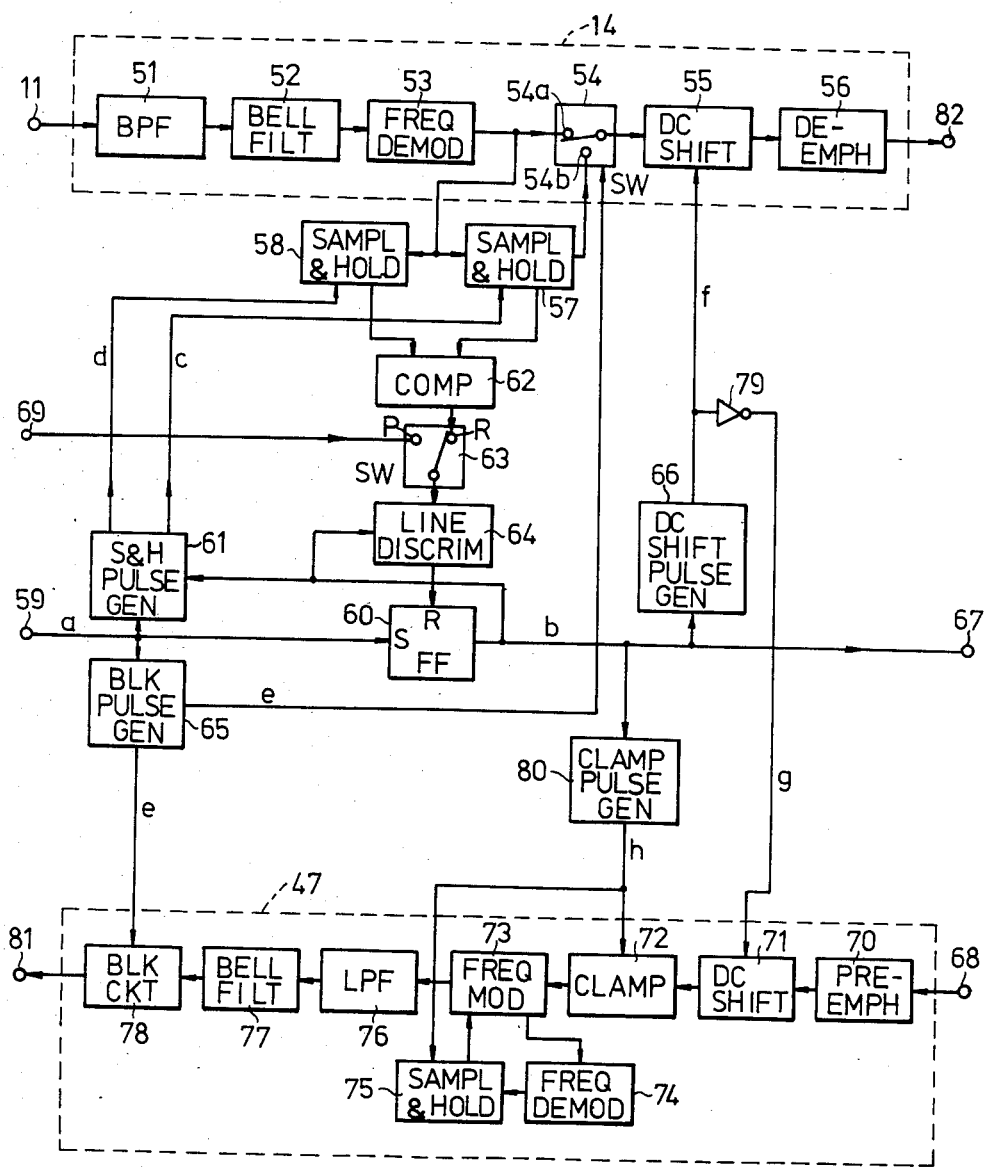
FIG. 3 is a systematic block diagram showing an embodiment of an essential part of the block system shown in FIG. 1.

Next, description will be given with respect to the construction and operation of the decoder 14 and the encoder 47. In FIG. 3, the decoder 14 is made up from blocks 51 through 56, and the encoder 47 is made up from blocks 70 through 78. A circuit part in FIG. 3 other than the blocks 51 through 56 and the blocks 70 through 78, are commonly used at the time of the recording and at the time of the reproduction, however, the decoder 14 and the encoder 47 are shown as being independently provided in FIG. 1. In the decoder 14, the bandpass filter 51 separates the carrier chrominance signal from the SECAM system color video signal, which carrier chrominance signal is a frequency modulated signal. This separated carrier chrominance signal is passed through the bell filter 52 and the frequency demodulator 53, and is formed into the line-sequential color difference signal in which the color difference signals (R−Y) and (B−Y) are alternately time-sequentially multiplexed for every 1 H.

The line-sequential color difference signal is supplied to a terminal 54a of the switching circuit 54, and to sample and hold circuits 57 and 58. The sample and hold circuit 57 samples and holds the level of the achromatic color part in the two kinds of color difference signals. In this case, the sample and hold circuit 57 samples and holds the level of the achromatic color part within the back porch duration of the color difference signal (B−Y), and supplies a sampled and held signal to a terminal 54b of the switching circuit 54.

A switching signal supplied to the switching circuit 54 and sampling and holding pulses supplied to the sample and hold circuits 57 and 58, are produced in a circuit part other than the decoder 14 and the encoder 47 shown in FIG. 3. This circuit part is commonly used at the time of the recording and at the time of the reproduction, and supplies signals to the decoder 14 at the time of the recording and supplies signals to the encoder 47 at the time of the reproduction. In other words, a square wave a shown in FIG. 4(A) which is in phase with the horizontal synchronizing signal, is applied to an input terminal 59 shown in FIG. 3. It is not essential for the square wave a to be a symmetrical square wave. This square wave a is supplied to a flip-flop 60, a sampling and holding pulse generating circuit 61, and a blanking pulse generating circuit 65. The flip-flop 60 frequency-divides the square wave a by $\frac{1}{2}$, and generates a square wave b shown in FIG. 4(B). This square wave b is supplied to the control pulse generating device 20 shown in FIG. 1, through an output terminal 67, as a color difference signal discriminating pulse. The square wave b is also supplied to the sampling and holding pulse generating circuit 61, a line discriminating circuit 64, and a D.C. shift pulse generating circuit 66 shown in FIG. 3.

The sampling and holding pulse generating circuit 61 generates two kinds of sampling and holding pulses c and d shown in FIGS. 4(C) and 4(D), from the square waves a and b. The sampling and holding pulse c is supplied to the sample and hold circuit 57 wherein the achromatic color part within the back porch duration in the transmission line of the color difference signal (B−Y) is sampled and held. At the same time, the sampling and holding pulse d is supplied to the sample and hold circuit 58 wherein the achromatic color part within the back porch duration in the transmission line of the color difference signal (R−Y) is sampled and held. A comparator 62 compares the levels of the output signals of the sample and hold circuits 57 and 58. An output signal of the comparator 62, which is based on the result of the level comparison, is supplied to the line discriminating circuit 64 through a switching circuit 63 which is connected to a terminal R.

Suppose that the square waves a and b and the sampling and holding pulses c and d are in the phase relationship shown in FIGS. 4(A), 4(B), 4(C), and 4(D), and that the color difference signal (B−Y) is produced from the frequency demodulator 53 in a duration of 1 H in which the square wave b assumes a low level. In this case, the output D.C. level of the sample and hold circuit 58 is higher than the output D.C. level of the sample and hold circuit 57, because the output D.C. level of the sample and hold circuit 58 is the D.C. level of the achromatic color part in the color difference signal (R−Y). Accordingly, in this case, the output signal of the comparator 62 assumes a low level, for example, so that a reset pulse is not produced from the line discriminating circuit 64. Hence, the flip-flop 60 will not be reset.

However, in a case where the frequency demodulator 53 produces the color difference signal (R−Y) in a duration of 1 H in which the square wave b assumes a low level, the output signal of the comparator 62 assumes a high level, for example. As a result, a reset pulse is produced from the line discriminating circuit 64, and the flip-flop 60 is reset by this reset pulse. Accordingly, the original relation is restored, where the color difference signal (B−Y) is produced in the duration of 1 H in which the output square wave b of the flip-flop 60 assumes a low level. The line discrimination of the SECAM system carrier chrominance signal is performed in this manner for every 1 H.

On the other hand, a square wave e shown in FIG. 4(E) is generated from the blanking pulse generating circuit 65. The square wave e assumes a low level for a duration corresponding to the transmission period of the achromatic color part and the horizontal synchronizing signal part. The square wave e is supplied to the switching circuit 54 as a switching signal. For a duration in which the square wave e assumes a high level, the switching circuit 54 supplies the input color difference signal applied to the terminal 54a thereof, to the D.C. shifting circuit 55. On the other hand, the switching circuit 54 supplies the input signal (that is, the level of the achromatic color part of the color difference signal (B−Y)) applied to the terminal 54b thereof to the D.C. shifting circuit 55, for a duration in which the square wave e assumes a low level. The D.C. shifting circuit 55 performs a D.C. shift with respect to the line-sequential color difference signal from the switching circuit 54, according to a pulse f shown in FIG. 4(F) from the D.C. shift pulse generating circuit 66, to eliminate the D.C. level difference between the color difference signals (R−Y) and (B−Y). An output line-sequential color difference signal of the D.C. shifting circuit 55, is supplied to the lowpass filter 15 shown in FIG. 1, through the de-emphasis circuit 56 and an output terminal 82. The line discrimination may be performed at a frequency, before the demodulation, of the achromatic color part within the back porch duration described before.

On the other hand, in the encoder 47, the reproduced line-sequential color difference signal applied to an input terminal 68, is supplied to the D.C. shifting circuit 71 through the pre-emphasis circuit 70. At the time of the reproduction, a square wave a having a period of 1 H as shown in FIG. 4(A), which is formed from the reproduced time-division-multiplexed signal, is applied to the input terminal 59. Further, the reproduced discriminating burst signal is applied to the input terminal 69, and is supplied to the line discriminating circuit 64 through the switching circuit 63. Accordingly, as described before for the case at the time of the recording, a pulse f shown in FIG. 4(F) is also generated from the D.C. shift pulse generating circuit 66 at the time of the reproduction. This pulse f is inverted of its polarity in an inverter 79. An output pulse g shown in FIG. 4(G) of the inverter 79, is supplied to the D.C. shifting circuit 71 as a shift pulse. In the D.C. shifting circuit 71, the reproduced line-sequential color difference signal is given a D.C. level difference between the color difference signals (R−Y) and (B−Y). This D.C. level difference is such that, at the output of the frequency modulator 73 which will be described hereinafter, the carrier frequency of the color difference signal (B−Y) is 4.25 MHz and the carrier frequency of the color difference signal (R−Y) is 4.406 MHz.

The reproduced line-sequential color difference signal which is given the D.C. level difference in the D.C.

shifting circuit 71, is supplied to the clamping circuit 72. The clamping circuit 72 clamps the reproduced line-sequential color difference signal from the D.C. shifting circuit 71, at the achromatic color part of the color difference signal (B−Y), by a clamping pulse h from a clamping pulse generating circuit 80. As shown in FIG. 4(H), the clamping pulse h has a period of 2 H. An output signal of the clamping circuit 72 is frequency-modulated in the frequency modulator 73. Hence, the carrier chrominance signal substantially in conformance with the SECAM system, which is a frequency modulated signal, is obtained from the frequency modulator 73. The carrier chrominance signal produced from the frequency modulator 73, is supplied to the frequency demodulator 74 and to the lowpass filter 76. The carrier chrominance signal from the frequency modulator 73 is not in complete comformance with the SECAM system, because this carrier chrominance signal has the chrominance subcarrier even at the horizontal synchronizing signal part.

The frequency demodulator demodulates the carrier chrominance signal from the frequency modulator 73, and supplies the demodulated carrier chrominance signal to the sample and hold circuit 75. The sample and hold circuit 75 samples and holds the potential of the achromatic color part in the color difference signal (B−Y) which has been demodulated, by the clamping pulse h from the clamping pulse generating circuit 80. The sampled and held output signal of the sample and hold circuit 75, is fed back to the frequency modulator 73. Accordingly, the oscillation frequency of the frequency modulator 73 is stabilized by this feedback. The lowpass filter 76 eliminates the unwanted high-frequency range component within the carrier chrominance signal from the frequency modulator 73. An output signal of the lowpass filter 76 is supplied to a blanking circuit 78 through the bell filter 77. The blanking circuit 78 only passes the reproduced carrier chrominance signal from the bell filter 77, for a duration in which the square wave e from the blanking pulse generating circuit 65 assumes a high level. In other words, for a duration in which the pulse e shown in FIG. 4(E) assumes a low level (this duration corresponds to the duration of the horizontal synchronizing signal, the duration in the vicinity of the horizontal synchronizing signal, and the like, in the SECAM system), the blanking circuit 78 blocks the reproduced carrier chrominance signal from the bell filter 77. Thus, the carrier chrominance signal which is in conformance with the SECAM system, is produced from the blanking circuit 78 through an output terminal 81.

At the time of the reproduction, a discriminating burst signal detection output having a period of 2 H, is supplied to the line discriminating circuit 64 through an input terminal 69 and the switching circuit 63. During a normal operation of the recording and reproducing apparatus, the square wave b assumes a low level while the discriminating burst signal detection output exists. Hence, the line discriminating circuit 64 does not produce a reset pulse, and the flip-flop 60 is not reset. However, during an erroneous operation of the recording and reproducing apparatus, the square wave b assumes a high level while the discriminating burst signal detection output exists. Thus, during the erroneous operation of the recording and reproducing apparatus, a reset pulse is produced from the line discriminating circuit 64, and the flip-flop 60 is reset. Therefore, even when the recording and reproducing apparatus carries out an erroneous operation, the recording and reproducing apparatus will be caused to operate normally.

The reproduced carrier chrominance signal in conformance with the SECAM system, which is produced from the encoder 47 through the output terminal 81, is supplied to the mixing circuit 48 shown in FIG. 1.

Figure 5A:
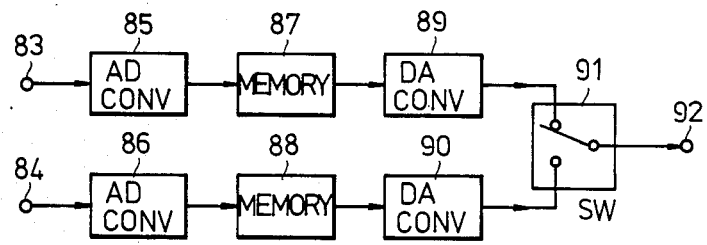
FIGS. 5A and 5B are systematic block diagrams showing a general construction of a first embodiment of another essential part of the apparatus according to the present invention.
Figure 5B:
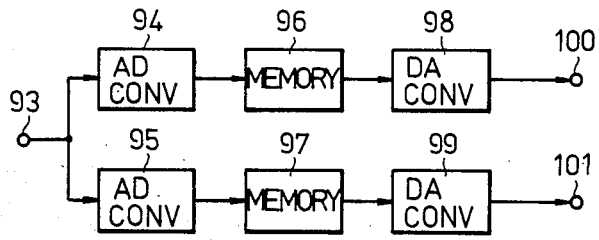

The time base compressing system and the time base expanding system in the embodiment shown in FIG. 1 are generally shown in FIGS. 5A and 5B, with reference to only AD converters, memory circuits, and DA converting circuits. In FIG. 5A, the luminance signal applied to an input terminal 83, is passed through an AD converter 85 and then supplied to a memory circuit 87 which performs a time base compression. On the other hand, the line-sequential color difference signal applied to an input terminal 84, is passed through an AD converter 86 and then supplied to a memory circuit 88 which performs a time base compression. Output digital time base compressed signals of the memory circuits 87 and 88, are supplied to a switching circuit 91 through respective DA converting circuits 89 and 90. The output time base compressed signals of the DA converting circuits 89 and 90 are time-division-multiplexed in the switching circuit 91, and produced through an output terminal 92.

On the other hand, the reproduced time-division-multiplexed signal is applied to an input terminal 93 shown in FIG. 5B. The reproduced time-division-multiplexed signal is supplied to memory circuits 96 and 97 through respective AD converters 94 and 95. A digital luminance signal which has been returned to its original time base by the time base expansion, is obtained from the memory circuit 96. The digital luminance signal from the memory circuit 96 is formed into a reproduced luminance signal in a DA converting circuit 98, and is produced through an output terminal 100. The digital line-sequential color difference signal which has been returned to its original time base by the time base expansion, is obtained from the memory circuit 97. This digital line-sequential color difference signal from the memory circuit 97 is formed into a reproduced line-sequential color difference signal in a DA converting circuit 99, and is produced through an output terminal 101. In other words, as shown in FIGS. 5A and 5B, the embodiment shown in FIG. 1 is designed to perform the time base compression and the time base expansion independently with respect to the luminance signal and the line-sequential color difference signal at the time of the recording and at the time of the reproduction.

Figure 6A:
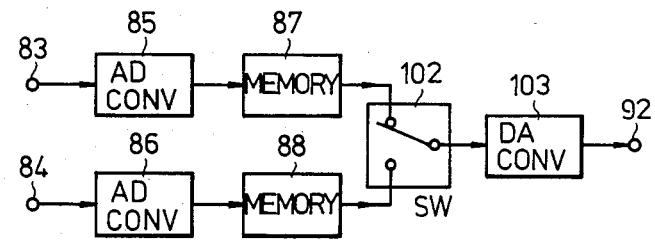
FIGS. 6A and 6B are systematic block diagrams showing a general construction of a second embodiment of the other essential part of the apparatus according to the present invention.
Figure 6B:
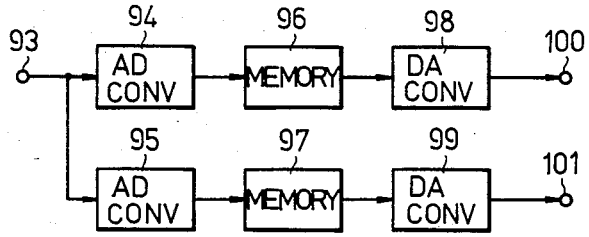

However, the present invention is not limited to the above, and the object of the present invention may also be achieved by second, third, and fourth embodiments of the time base compressing system and the time base expanding system respectively shown in FIGS. 6A and 6B, FIGS. 7A and 7B, and FIGS. 8A and 8B. In FIGS. 6A through 8B, those parts which are the same as those corresponding parts in FIGS. 5A and 5B are designated by the same reference numerals, and their description will be omitted. The second embodiment shown in FIGS. 6A and 6B is designed to time-division-multiplex the output digital time compressed signals of the memory circuits 87 and 88 in a switching circuit 102. An output time-division-multiplexed signal of this switching circuit 102 is supplied to a DA converting circuit 103. According to this second embodiment, only a single DA converting circuit is required.

Figure 7A:
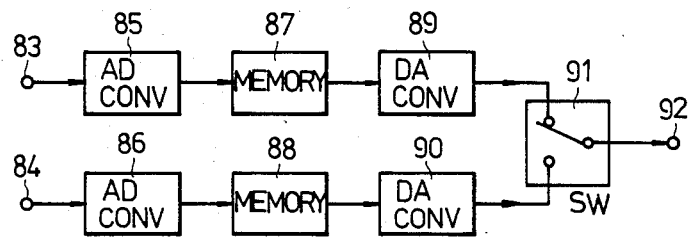
FIGS. 7A and 7B are systematic block diagrams showing a general construction of a third embodiment of the other essential part of the apparatus according to the present invention.
Figure 7B:
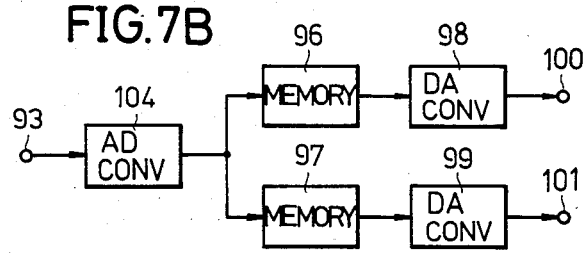
Figure 8A:
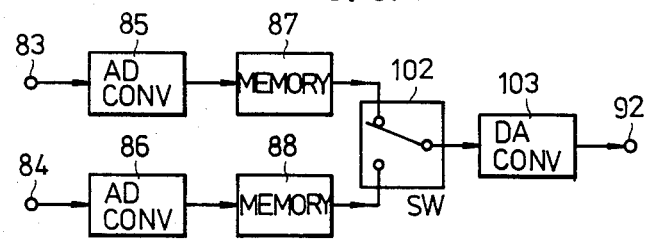
FIGS. 8A and 8B are systematic block diagrams showing a general construction of a fourth embodiment of the other essential part of the apparatus according to the present invention.
Figure 8B:
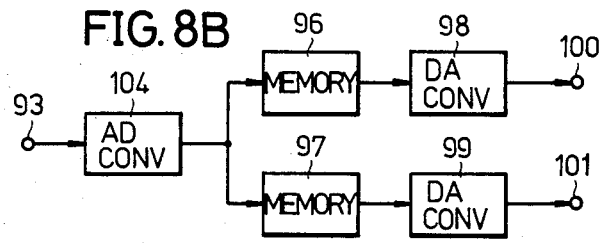

In the third embodiment shown in FIGS. 7A and 7B, the time compressing system used at the time of the recording is the same as the time compressing system of the first embodiment shown in FIGS. 5A and 5B. However, in this third embodiment, an AD converter 104 in the time expanding system used at the time of the reproduction is designed to be commonly convert the reproduced time base compressed luminance signal and the reproduced time base compressed line-sequential color difference signal The fourth embodiment shown in FIGS. 8A and 8B is designed to commonly use the DA converting circuit 103 at the time of the recording with respect to the luminance signal and the line-sequential color difference signal, and to commonly use the AD converter 104 at the time of the reproduction with respect to the luminance signal and the line-sequential color difference signal. This fourth embodiment shown in FIGS. 8A and 8B combines the time base compressing system shown in FIG. 6A with the time base expanding system shown in FIG. 7B.

In actual practice, a lowpass filter will be required at the input stage of the AD converters 85, 86, 94, 95, and 104 shown in FIGS. 5A through 8B. Further, a lowpass filter will be required in the output stage of the DA converting circuits 89, 90, 98, 99, and 103. Moreover, a circuit corresponding to the control pulse generating device 20 will also be required.

Figure 9:
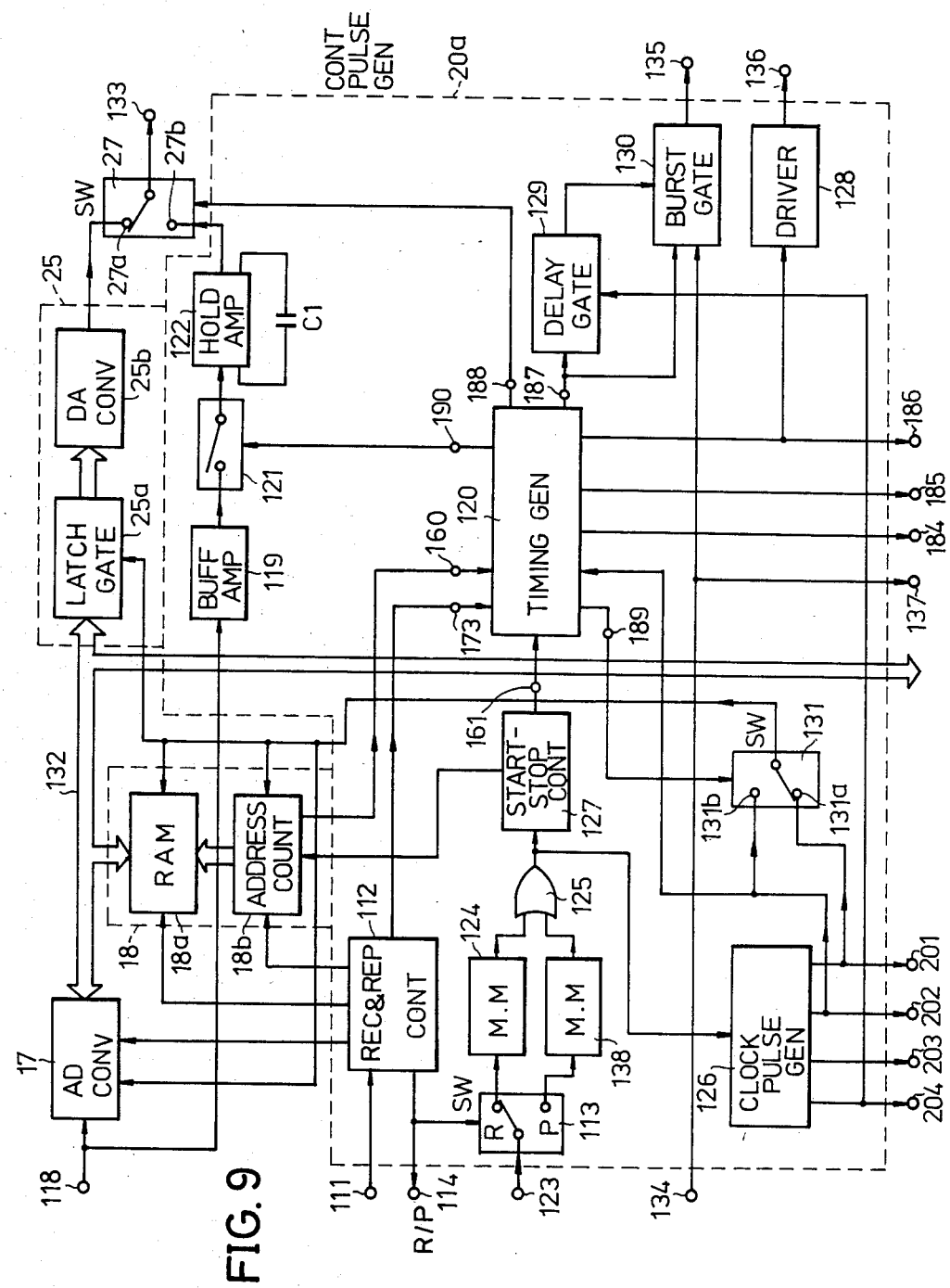
FIG. 9 is a systematic circuit diagram showing an embodiment of a part of a control pulse generating device within the block system shown in FIG. 1.
Figure 10:
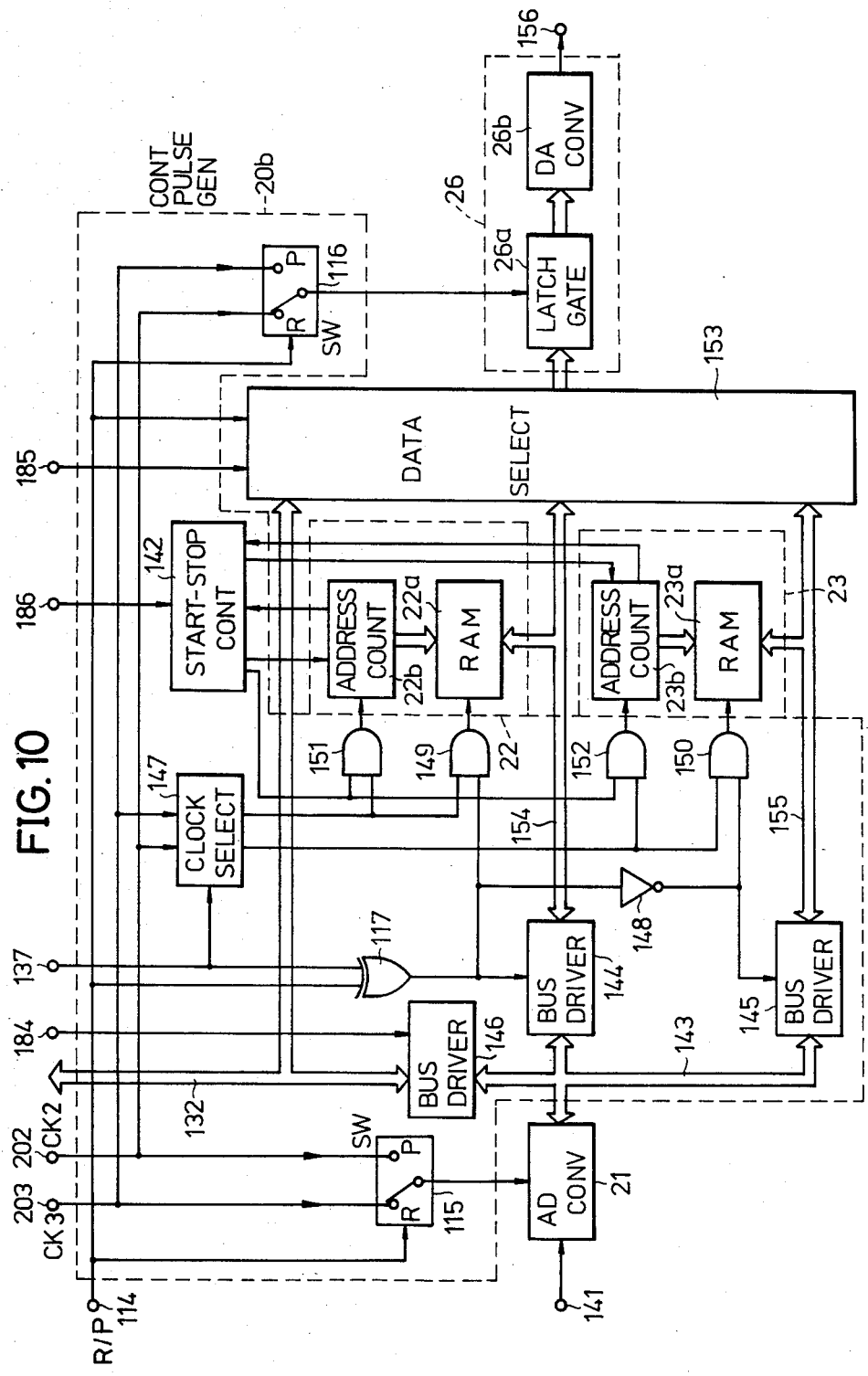
FIG. 10 is a systematic circuit diagram showing an embodiment of another part of the control pulse generating device within the block system shown in FIG. 1.

Next, a more detailed description will be given with respect to the time base compressing system and the time base expanding system by referring to FIGS. 9 through 15. FIGS. 9 and 10 show a circuit part which corresponds to a circuit part 110 represented by a phantom line in FIG. 1. In FIGS. 9 and 10, those parts which are the same as those corresponding parts in FIG. 1 are designed by the same reference numerals. A control pulse generating circuit 20a shown in FIG. 9 and a control pulse generating circuit 20b shown in FIG. 10 constitute the control pulse generating device 20 shown in FIG. 1.

First, description will be given with respect to the operation at the time of the recording, by referring to FIGS. 9 and 10. At the time of the recording, a signal from a recording and reproducing switch (not shown) is supplied to a recording and reproduction control circuit 112 through an input terminal 111. An output signal R/P of the recording and reproduction control circuit 12 is applied to a switching circuit 113 to connect this switching circuit 113 to a terminal R. The signal R/P is also supplied to switching circuits 115 and 116 and to an exclusive-OR circuit 117 shown in FIG. 10, through a terminal 114. The switching circuits 115 and 116 are connected to respective terminals R by the signal R/P. The signal R/P is also supplied to the switching circuits 12 and 16 shown in FIG. 1.

The line-sequential color difference signal from the switching circuit 16, is supplied to the AD converter 17 and to a buffer amplifier 119, through an input terminal 118 shown in FIG. 9. For example, it is assumed that the color video signal to be recorded is a color bar signal in conformance with the SECAM system as shown in FIGS. 14(A) and 2(A). In this case, a line-sequential color difference signal shown in FIGS. 13(B) and 14(B) is applied to the input terminal 118. As may be seen from FIG. 14(B), there is a predetermined level difference between a D.C. level $b_1$ of the achromatic color part (non-modulated carrier part) having the width of 4.9 $\mu$s located at the back porch within the duration of 1 H in which the color difference signal (B−Y) is transmitted, and a D.C. level $b_2$ of the achromatic color part (non-modulated carrier part) having the width of 4.9 $\mu$s located at the back porch within the subsequent duration of 1 H in which the color difference signal (R−Y) is transmitted. This is because the chrominance subcarrier frequency of the carrier chrominance signal is 4.25 MHz for the color difference signal (B−Y) and 4.406 MHz for the color difference signal (R−Y).

The line-sequential color difference signal from the buffer amplifier 119, is supplied to a switching circuit 121. The switching of the switching circuit 121 is controlled by a switching pulse from a timing generator 120. As shown in FIGS. 13(P) and 14(C), this switching pulse from the timing generator 120 has a period of 1 H, and is generated at substantially the center position of the achromatic color part having the width of 4.9 $\mu$s within the back porch of each of the color difference signals (R−Y) and (B−Y). The switching circuit 121 passes the line-sequential color difference signal from the buffer amplifier 119 only for a duration in which the switching pulse assumes a high level. The output signal of the switching circuit 121 is supplied to a holding amplifier 122 which has a holding capacitor $C_1$, and is held therein. Hence, a sampled and held voltage of the D.C. level of the achromatic color part in the line-sequential color difference signal, is obtained from the holding amplifier 122. This sampled and held voltage from the holding amplifier 122 is applied to the terminal 27b of the switching circuit 27.

On the other hand, a horizontal synchronizing signal shown in FIG. 13(D) which is obtained from the horizontal synchronizing signal separating circuit 19, is applied to an input terminal 123. This horizontal synchronizing signal is passed through the switching circuit 113, a monostable multivibrator 124, and an OR circuit 125, before being supplied to a clock pulse generator 126 and to a start/stop control circuit 127. The clock pulse generator 126 and the start/stop control circuit 127 will be described later on in the specification. An output signal of the start/stop control circuit 127 is supplied to a counter within the timing generator 120, and to an address counter 18b so as to control the counting operation of the address counter 18b. The address counter 18b constitutes the memory circuit 18, together with a RAM 18a.

Figure 11:
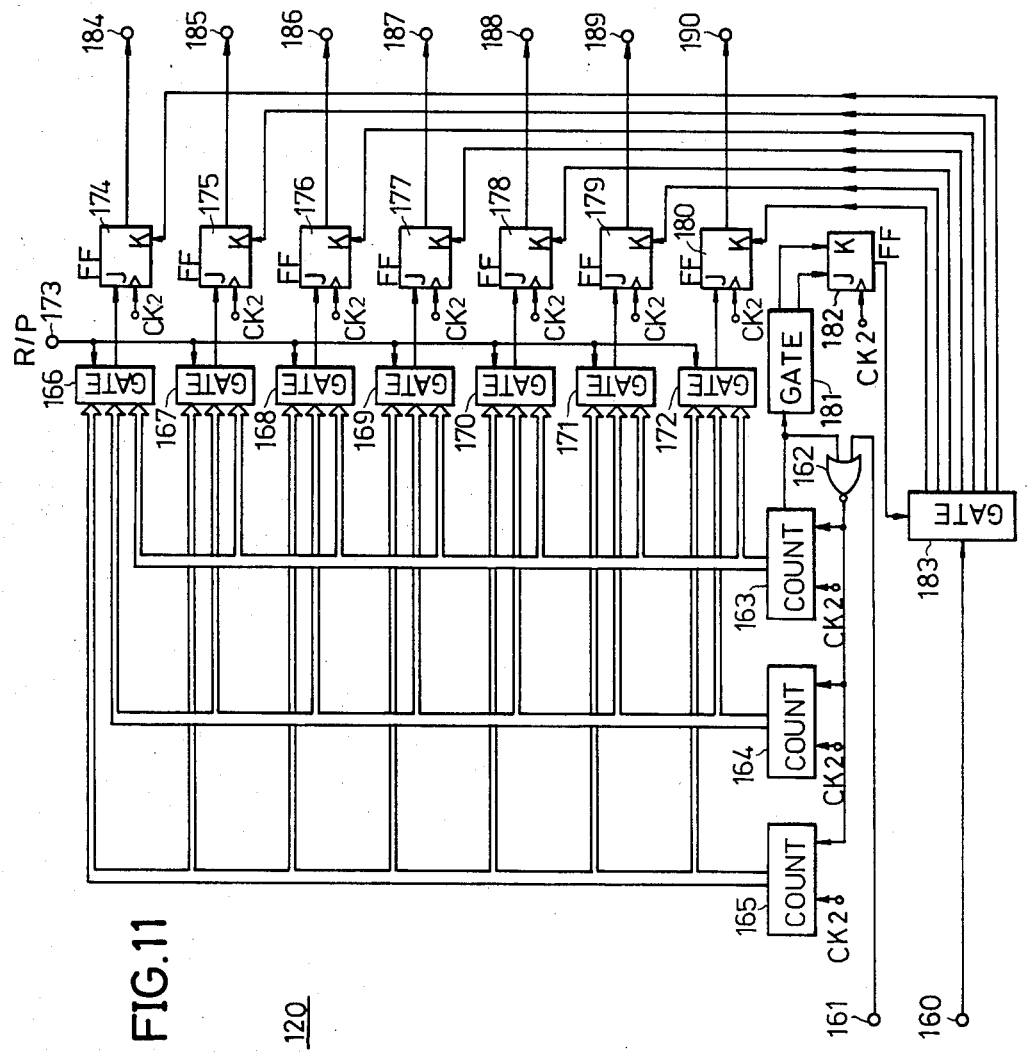
FIG. 11 is a systematic circuit diagram showing an embodiment of a timing generator within the circuit system shown in FIG. 9.

The timing generator 120 generates pulses for determining the timings of circuits within the control generating device 20, and description will now be given with respect to the timing generator 120 by referring to FIG. 11. In FIG. 11, a pulse shown in FIG. 13(G) from the start/stop control circuit 127, is supplied to a NOR-circuit 162 through an input terminal 161. The NOR-circuit 162 performs a NOR operation between the pulse from the input terminal 161 and an output signal of a counter 163. An output signal of this NOR-circuit 162 is applied to counters 163, 164, and 165 as a reset pulse. A second clock pulse CK2 of 10 MHz, for example, is supplied to the counters 163 through 164 from the clock pulse generator 126. The counters 163 through 163 count the second clock pulse CK2. A counted value which is made up from output signals of the counters 163 through 165, indicates the most significant digit by the output signal of the counter 163 and indicates the least significant digit by the output signal of the counter 165. This counted value is supplied to gate circuits 166 through 172. The gate circuits 166 through 172 gate the signals at the counted value which is independently set for the recording and for the reproduction, by the signal R/P which is applied to the gate circuits 166 through 172 from the recording and reproduction control circuit 112 through a terminal 173. The output signals of the gate circuits 166 through 172 are supplied to J terminals of respective J-K flip-flops 174 through 180.

The clock pulse CK2 described before, is applied to clock terminals of the J-K flip-flops 174 through 180. In addition, the output signal of the counter 163 is supplied to J and K terminals of a J-K flip-flop 182, through a gate circuit 181. The clock pulse CK2 is applied to a clock terminal of the J-K flip-flop 182. An output signal of the J-K flip-flop 182 is supplied to a gate circuit 183. A pulse shown in FIG. 13(F) from the address counter 18b, which indicates the completion of the count, is applied to the gate circuit 183 through an input terminal 160. The gate circuit 183 gates and supplies this pulse from the input terminal 160 to K terminals of the J-K flip-flops 174 through 180, as a clear pulse, based on the output signal of the J-K flip-flop 182.

Accordingly, the J-K flip-flop 174 normally produces a low-level signal through a terminal 184, at the time of the recording and at the time of the reproduction. However, in a case where only one of the AD converters 17 and 21 is used at the time of the reproduction which will be described later, the J-K flip-flop 174 produces a pulse shown in FIG. 13(H) only at the time of the reproduction, and produces no pulse at the time of the recording. The J-K flip-flop 175 produces a pulse shown in FIG. 13(I) through a terminal 185, only at the time of the recording. This pulse shown in FIG. 13(I) assumes a high level for a duration in which the time base compressed line-sequential color difference signal is transmitted. The J-K flip-flop 175 produces no pulse at the time of the recording. The J-K flip-flop 176 produces a pulse shown in FIG. 13 (J) through a terminal 186, and supplies this pulse to a driver 128 shown in FIG. 9 and to a start/stop control circuit 142 shown in FIG. 10.

The J-K flip-flop 177 produces through a terminal 187, a pulse shown in FIGS. 13(K) and 15(A) having a width of approximately 4 μs, as the horizontal synchronizing signal. This horizontal synchronizing signal is supplied to a delay gate circuit 129 and to a burst gate circuit 130 shown in FIG. 9. The J-K flip-flop 178 produces a pulse shown in FIGS. 13(L) and 14(D) through a terminal 188, at the time of the recording. At the time of the reproduction, the J-K flip-flop 178 produces a pulse shown in FIG. 13(M) through the terminal 188, and this pulse is applied to the switching circuit 27 as a switching pulse. Further, the J-K flip-flop 179 produces a pulse shown in FIG. 13(N) through a terminal 189, and supplies this pulse to a switching circuit 131 shown in FIG. 9, as a switching pulse. At the time of the recording, the J-K flip-flop 180 produces a pulse shown in FIGS. 13(P) and 14(C) through a terminal 190. The J-K flip-flop 180 produces a pulse shown in FIG. 13(O) through the terminal 190, at the time of the reproduction. The output pulse of the J-K flip-flop 180 is supplied to the switching circuit 121 through the terminal 190, as a switching pulse, and turns the switching circuit 121 ON only for a duration in which this switching pulse assumes a high level.

Figure 12:
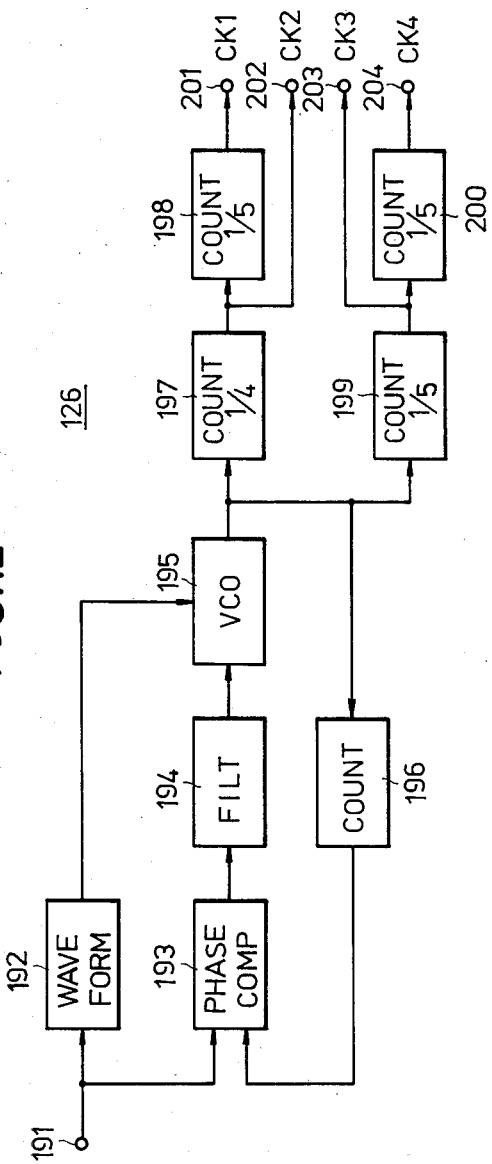
FIG. 12 is a systematic block diagram showing an embodiment of a clock pulse generating circuit within the circuit system shown in FIG. 9.
Figure 13:
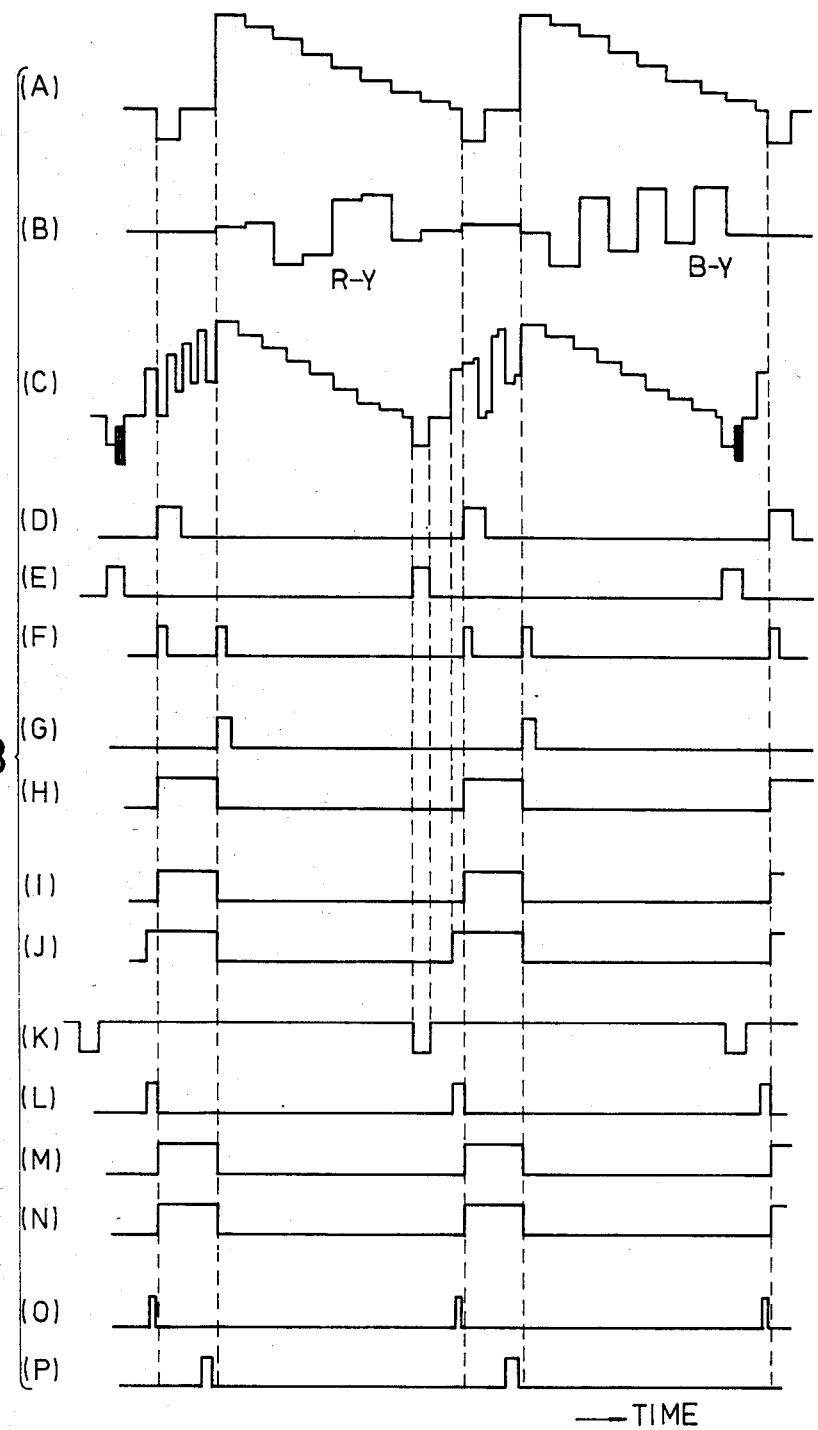
FIGS. 13(A) through 13(P) respectively show signal waveforms for explaining the operation of the circuit system shown in FIG. 11.
Figure 14:
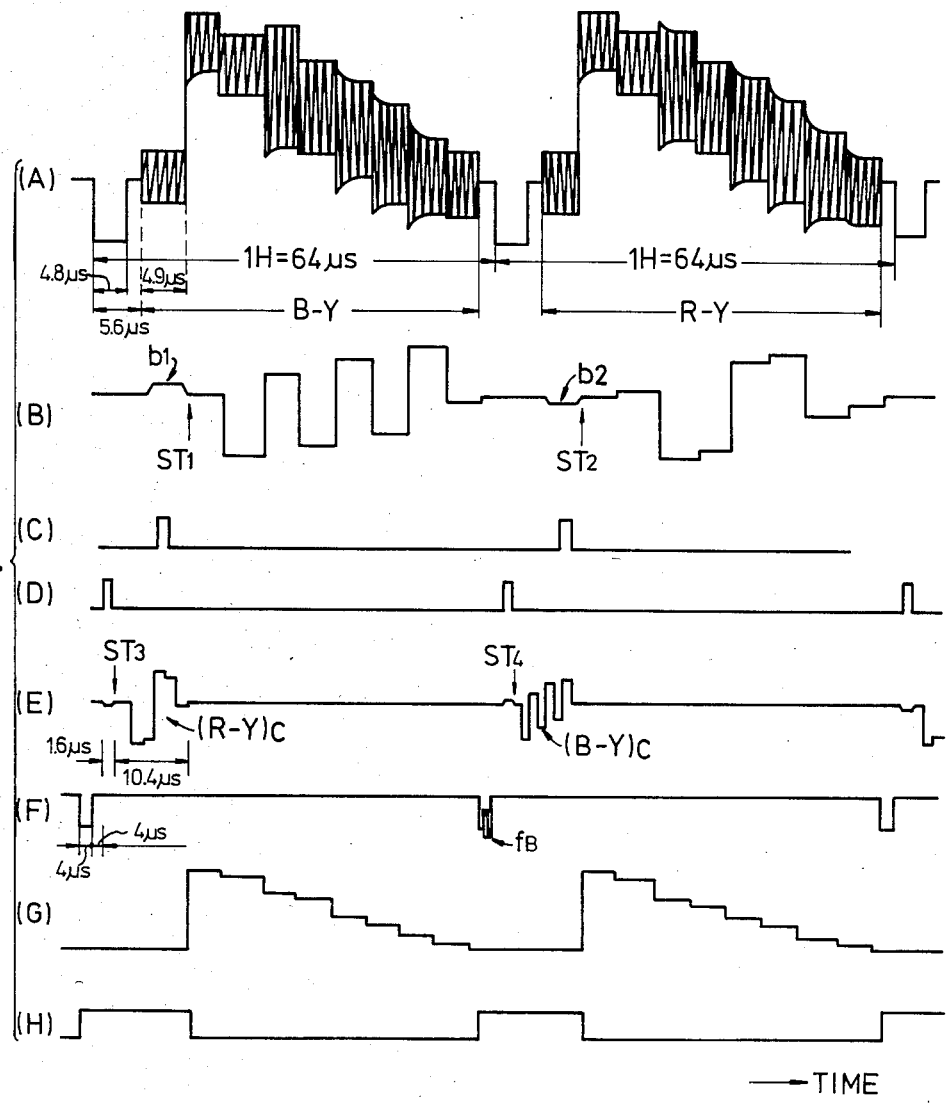
FIGS. 14(A) through 14(H) respectively show signal waveforms for explaining the operation of the systems shown in FIGS. 1, 9, and 10.
Figure 15:
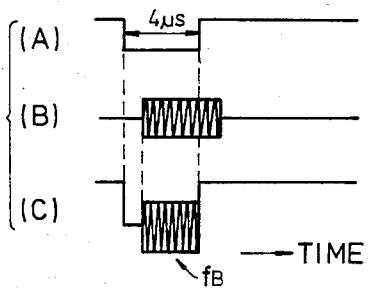
FIGS. 15(A) through 15(C) respectively show signal waveforms for explaining the operation of an essential part of the circuit system shown in FIG. 9.

The clock pulse generator 126 shown in FIG. 9, has a construction shown in FIG. 12. The signal from the OR-circuit 125 shown in FIG. 9, is applied to an input terminal 191 shown in FIG. 12. The signal from the input terminal 191 is supplied to a wave forming circuit 192 and to a phase comparator 193. The phase comparator 193, a filter 194, a voltage controlled oscillator (VCO) 195, and a counter 196 constitute a known phase locked loop (PLL). The VCO 195 in this PLL produces a signal which has a frequency of 40 MHz, for example, and is in phase with the horizontal synchronizing signal, because the VCO 195 is reset by an edge (coincides with the rising edge of the horizontal synchronizing signal) of the output signal of the wave forming circuit 192. The response frequency of the PLL is set so that the PLL can sufficiently follow the time base deviation in the horizontal synchronizing signal which is reproduced in the recording and reproducing apparatus. This measure is taken because, in a case where the sampling does not always start with the same timing when performing the compression and expansion of the time base, the color irregularity will occur proportionally to the expansion rate with which the deviation at the time of the compression is expanded. In addition, when the PLL does not sufficiently follow the time base deviation in the reproduced horizontal synchronizing signal, the color difference signals and the luminance signal will deviate on the reproduced picture, due to the difference in the time base compression rate of the time base compressed luminance signal and the time base compressed line-sequential color difference signal, and the like.

The output signal of the VCO 195 is frequency-divided by ¼ in a counter 197, and is further frequency-divided by 1/5 in a counter 198. The counter 197 produces the second clock pulse CK2 through a terminal 202. On the other hand, the counter 198 produces a first clock pulse CK1 through a terminal 201. At the same time, the output signal of the VCO 195 is frequency-divided divided by 1/5 in a counter 199, and is further frequency-divided by 1/5 in a counter 200. The counter 199 produces a third clock pulse CK3 through a terminal 203, and the counter 200 produces a fourth clock pulse CK4 through a terminal 204. The frequency of the output signal of the VCO 195 is 40 MHz, for example. Accordingly, the frequencies of the clock pulses CK1, CK2, CK3, and CK4 respectively are 2 MHz, 10 MHz, 8 MHz, and 1.6 MHz. At the time of the recording, a fifth clock pulse CK5 which is obtained through the switching circuit 131, has a repetition frequency of 2 MHz which is equal to the frequency of the first clock pulse CK1.

Returning now to the description of FIG. 9, the line-sequential color difference signal is subjected to an analog-to-digital conversion in the AD converter 17, based on the fifth clock pulse CK5 of 2 MHz. For example, the line-sequential color difference signal is converted into a digital line-sequential color difference signal having a quantization number of 6 bits for one picture element. This digital line-sequential color difference signal from the AD converter 17 is supplied to the RAM 18a, through a bi-directional data bus 132. This RAM 18a and the address counter 18b are supplied with the fifth clock pulse CK5 of 2 MHz, and the digital line-sequential color difference signal is written into the RAM 18a at an address which is designated by the address counter 18b. This write-in to the RAM 18a starts at points ST1 and ST2 shown in FIG. 14(B), that is, at the beginning of the video duration of 52 μs. The timing with which the above write-in is performed may be accurately determined, by delaying the timing by an interval between the horizontal synchronizing signal and the beginning of the video duration, in the monostable multivibrator 124 which is triggered by the horizontal synchronizing signal shown in FIG. 13(D), and by thereafter starting the operation of the timing generator 120 by the start/stop control circuit 127.

When the RAM 18a completes the write-in of the color difference signal (R−Y) or (B−Y) of the video duration of 52 μs, the RAM 18a is controlled by an output signal of the recording and reproduction control circuit 112 so that a read-out operation is started after approximately 1.6 μs has elapsed. Moreover, the switching circuit 131 is switched over by the pulse shown in FIG. 13(N) and is connected to a terminal 131b, so as to produce the second clock pulse CK2 as the fifth clock pulse CK5. Thus, after the above duration of approximately 1.6 μs has elapsed, the written color difference signal is read out from the RAM 18a by the clock pulse of 10 MHz. Accordingly, the digital color difference signal which has been time base compressed to 1/5, is obtained from the RAM 18a and is applied to the terminal 27a of the switching circuit 27, through a latch gate 25a which is applied with the fifth clock pulse CK5 and a DA converter 25b. At the time of the recording, the pulse shown in FIGS. 13(L) and 14(D) is supplied to the switching circuit 27 from the timing generator 120 through the terminal 188, and the switching circuit 27 passes the input signal to the terminal 27b thereof for a duration in which the supplied pulse assumes a high level. The switching circuit 27 passes the input signal to the terminal 27a thereof for a duration in which the supplied pulse assumes a low level.

Accordingly, a time base compressed line-sequential color difference signal shown in FIG. 14(E) is selectively produced from the switching circuit 27, through an output terminal 133. In the time base compressed line-sequential color difference signal shown in FIG. 14(E), the D.C. level of the achromatic part of the color difference signal is transmitted for approximately 1.6 μs, and immediately thereafter, one of the color difference signals having a duration of 52 μs is time base compressed to 1/5 and transmitted for 10.4 μs. Further, the time base compressed color difference signals are transmitted line-sequentially. In FIG. 14(E), the time base compressed color difference signal (R−Y) is represented by (R−Y)$_C$, and the time base compressed color difference signal (B−Y) is represented by (B−Y)$_C$. The time base compressed line-sequential color difference signal shown in FIG. 14(E) is delayed by 1 H with respect to the line-sequential color difference signal shown in FIG. 14(B). This is because the color difference signal corresponding to the duration of 1 H is first written into the RAM 18a before it is read out. According to the present embodiment, the D.C. level of the achromatic color part is obtained by the sampling and holding, and the sampled and held D.C. level of the achromatic color part is selectively produced from the switching circuit 27. As a result, even when the time base compression is not started from the achromatic color part, it is possible to obtain an output which is substantially the same as the time base compressed output of the achromatic color part. Therefore, according to the present embodiment, it is possible to greatly reduce the required memory capacity of the RAM 18a, compared to the case where the time base compression is started from the achromatic color part. In addition, it is possible to transmit the D.C. level of the achromatic color part in the line-sequential color difference signal with a high precision, without introducing an error which would occur when the D.C. level of the achromatic color part in the line-sequential color difference signal is processed digitally.

On the other hand, the timing generator 120 generates a pulse shown in FIGS. 13(K) and 15(A) immediately after the video duration. This pulse has a width of approximately 4 μs, and has a period of 1 H. The timing generator 120 supplies this pulse to the burst gate circuit 130 and to the delay gate circuit 129, through the terminal 187. The delay gate circuit 129 delays the fourth clock pulse CK4 of 1.6 MHz by a predetermined delay time, based on the pulse which is supplied thereto from the timing generator 120 through the terminal 187. Thus, the fourth clock pulse CK4 of 1.6 MHz is produced from the delay gate circuit 129 as a burst signal as shown in FIG. 15(B), and is supplied to the burst gate circuit 130. As a result, the burst gate circuit 130 produces the pulse shown in FIG. 15(A) from the timing generator 120, and produces the burst signal shown in FIG. 15(B) only for a duration in which the pulse shown in FIG. 15(A) assumes a low level. The burst signal shown in FIG. 15(B) is produced through an output terminal 135 for every other 1 H, responsive to the square wave b showing in FIG. 4(B) which has a period of 2 H and is produced through the output terminal 67 shown in FIG. 3 and supplied to the burst gate circuit 130 through an input terminal 134 shown in FIG. 9. Accordingly, a multiplexed signal shown in FIGS. 15(C) and 14(F) is obtained through the output terminal 135. The output pulse shown in FIGS. 13(K) and 15(A) of the timing generator 120, and the burst signal shown in FIG. 15(B), are multiplexed in the multiplexed signal shown shown in FIGS. 15(C) and 14(F). The multiplexed signal which is obtained through the output terminal 135, is supplied to the switching circuit 29 shown in FIG. 1. In the multiplexed signal which is supplied to the switching circuit 29, the pulse shown in FIGS. 13(K) and 15(A) from the terminal 187 is used as the horizontal synchronizing signal, and the burst signal represented by f$_B$ in FIGS. 14(F) and 15(C) is used as the discriminating burst signal described before.

When the fourth clock pulse CK4 is gated for every other 1 H by the pulse which is obtained from the timing generator 120 through the terminal 187 and has the width of approximately 4 μs, the edge of the pulse which is produced as the horizontal synchronizing signal becomes distorted due to the phase of the fourth clock pulse CK4 and the like. The delay gate circuit 129 prevents the picture quality of the reproduced picture from becoming deteriorated by such a jitter.

The output signal shown in FIG. 13(J) of the timing generator 120, is supplied to the driver 128 which produces signal shown in FIG. 14(H) through an output terminal 136. The signal shown in FIG. 14(H) is produced as a switching pulse which assumes a low level in correspondence with the duration in which the time base compressed luminance signal shown in FIG. 14(G) is transmitted. The switching pulse produced through the output terminal 136 is supplied to the switching circuit 29 shown in FIG. 1, and to the start/stop control circuit 142 shown in FIG. 10 through the terminal 186.

Next, description will be given with respect to the recording system for the luminance signal. The luminance signal applied to an input terminal 141 shown in FIG. 10, is supplied to the AD converter 21. In the AD converter 21, the luminance signal is converted into a digital luminance signal having a quantization number of 7 bits for one picture element, for example, based on the third clock pulse CK3 which is generated from the timing generator 120 and applied to the AD converter 21 through the terminal 203 and the switching circuit 115. The output digital luminance signal of the AD converter 21 is supplied to bus drivers 144, 145, and 146, through a bi-directional bus 143. At the time of the recording, the bus driver 146 is turned OFF by a signal received from the timing generator 120 through the terminal 184. On the other hand, the above described symmetrical square wave which has a period of 2 H and is obtained from the input terminal 134 through a terminal 137, is applied to a clock selector 147. This clock selector 147 alternately produces the second clock pulse CK2 through one output terminal thereof and the third clock pulse CK3 through another output terminal thereof, for every 1 H. The square wave which is obtained through the terminal 137 is supplied to the bus driver 144, through the exclusive-OR circuit 117. This square wave from the terminal 137 is also supplied to an inverter 148 and to an AND-circuit 149. An output signal of the inverter 148 is applied to the bus driver 145 and to an AND-circuit 150.

Accordingly, the bus drivers 144 and 145 are alternately turned ON for every 1 H. The output digital luminance signal of the AD converter 21 is thus passed through the bus driver 144 or 145 which is ON, and then supplied to a RAM 22a or 23a. The digital luminance signal supplied to the RAM 22a or 23a, is written into the RAM 22a or 23a at an address which is designated by an address counter 22b or 23b, by the third clock pulse CK3. One of the clock pulses CK2 and CK3, is supplied to the address counters 22b and 23b through respective AND-circuits 151 and 152. The same clock pulse is produced from the AND-circuits 149 and 151, and the same clock pulse is produced from the AND-circuits 150 and 152. An output which is read out by the second clock pulse CK2, is obtained from the RAM 22a or 23a which is connected through the data bus to the bus driver 144 or 145 which is OFF. The frequencies of the second and third clock pulses CK2 and CK3 are 10 MHz and 8 MHz, respectively. Thus, a digital luminance signal which has been time base compressed by 20% of the video duration, is alternately obtained from the RAMs 22a and 23a for every 1 H, and is supplied to a data selector 153. This data selector 153 constitutes the switching circuit 24 shown in FIG. 1.

As in the case of the write-in to the RAM 18a described before, the write-in of the luminance signal to the RAMs 22a and 23a is started at the beginning of the video duration of 52 μs. Based on the signal R/P from the terminal 114 and the signal shown in FIG. 13(I) from the terminal 185, the data selector 153 turns ON a data bus 155 from the bus driver 145 when the bus driver 144 is OFF, and turns ON a data bus 154 from the bus driver 144 from the data bus 144 when the bus driver 145 is OFF, and connects to a latch gate 26a. Accordingly, the read-out data from one of the RAMs 22a and 23a which is performing the read-out operation, is supplied to the latch gate 26a within the DA converting circuit 26, through the data selector 153. The read-out data is latched in the latch gate 26a, by the second clock pulse CK2 of 10 MHz which is supplied to the latch gate 26a from the terminal 202 through the switching circuit 116. The latched output of the latch gate 26a is converted into an analog signal in a DA converter 26b, and is produced through an output terminal 156 as the time base compressed luminance signal shown in FIG. 14(G).

Next, description will be given with respect to the operation at the time of the reproduction. At the time of the reproduction, the switching circuits 113, 115, and 116 are switched over and connected to respective terminals P by the signal R/P. The reproduced time-division-multiplexed signal shown in FIG. 13(C) is applied to the input terminal 118 shown in FIG. 9 and the input terminal 141 shown in FIG. 10, through the low-pass filter 13 shown in FIG. 1. The reproduced time-division-multiplexed signal applied to the input terminal 118, is supplied to the AD converter 17 and to the buffer amplifier 119. The reproduced time-division-multiplexed signal applied to the input terminal 141, is supplied to the AD converter 21. The reproduced horizontal synchronizing signal shown in FIG. 13(E) which is applied to the input terminal 123 shown in FIG. 9, is supplied to a monostable multivibrator 138 through the switching circuit 113, and is subjected to a wave-shaping in the monostable multivibrator 138. An output pulse of the monostable multivibrator 138 is supplied to the clock pulse generator 126 through the OR-circuit 125. The clock pulse generator 126 generates the four kinds of clock pulses CK1, CK2, CK3, and CK4 described before.

The switching of the switching circuit 131 ia controlled by the switching pulse shown in FIG. 13(N) which is generated from the timing generator 120 and applied to the switching circuit 131 through the terminal 189. The switching circuit 131 is switched over and connected to the terminal 131b and selectively passes the second clock pulse CK2, for a duration in which the switching pulse shown in FIG. 13(N) assumes a high level. On the other hand, the switching circuit 131 is switched over and connected to a terminal 131a and selectively passes the first clock pulse CK1, for a duration in which the switching pulse shown in FIG. 13(N) assumes a low level. At the time of the reproduction, the RAM 18a is controlled to perform the write-in operation for a duration in which the switching circuit 131 produces the second clock pulse CK2, and to perform the read-out operation for a duration in which the switching circuit 131 produces the first clock pulse CK1. Accordingly, a digital line-sequential color difference signal which has been time base expanded to 5/1 and returned to its original time base, is obtained from the RAM 18a and supplied to the latch gate 25a wherein the digital line-sequential color difference signal is latched. The output digital signal of the latch gate 25a is supplied to the terminal 27a of the switching circuit 27 through the DA converter 25b.

On the other hand, at the time of the reproduction, the switching of the switching circuit 121 is controlled by the switching pulse shown in FIG. 13(D) which is generated from the timing generator 120 and applied to the switching circuit 121 through the terminal 190. As shown in FIG. 13(D), this switching pulse assumes a high level only for a duration in which the color reference level of the reproduced time-division-multiplexed signal is transmitted. As a result, the switching circuit 121 only passes the color reference level of the reproduced time-division-multiplexed signal, and supplies this color reference level to the holding amplifier 122. Hence, a voltage which is obtained by holding the color reference level of the reproduced time-division-multiplexed signal, is applied to the terminal 27b of the switching circuit 27. At the time of the reproduction, the switching circuit 27 is switched over and connected to the terminal 27b for a duration in which the time base compressed color difference signal within the reproduced time-division-multiplexed signal is transmitted, so as to selectively produce the above sampled and held voltage, by the switching pulse shown in FIG. 13(M). Otherwise, the switching circuit 27 is switched over and connected to the terminal 27a, so as to selectively produce the output signal of the DA converter 25b. Accordingly, a reproduced line-sequential color difference signal in which the color reference level has been added as shown in FIG. 13(B), is obtained through the output terminal 133.

The digital signal which is produced from the AD converter 21 by the analog-to-digital conversion performed therein based on the second clock pulse CK2 from the switching circuit 115, is supplied to the bus drivers 144, 145, and 146. The bus driver 146 is constantly turned OFF. On the other hand, the bus drivers 144 and 145 are alternately turned ON for every 1 H. At the time of the reproduction, the transmission paths of the clock pulses CK2 and CK3 are switched over, and the RAMs 22a and 23a perform the write-in operation at 10 MHz and perform the read-out operation at 8 MHz. Thus, a digital signal which has been time base expanded to 5/4, is supplied to the latch gate 26a through the data selector 153. This time base expanded digital signal is latched in the latch gate 26a, based on the third clock pulse CK3 from the switching circuit 116. The output signal of the latch gate 26a is passed through the DA converter 26b, and is produced through the output terminal 154 as a reproduced luminance signal which has been returned to its original time base as shown in FIG. 13(A). The reproduced time base compressed line-sequential color difference signal and the reproduced time base compressed luminance signal are respectively time-division-multiplexed as shown in FIGS. 2 (B) and 13(C), but these reproduced time base compressed signals can be separated in the switching circuit 27 and the data selector 153.

The description given heretofore corresponds to the operation of the circuit shown in FIGS. 5A and 5B. However, the circuit may be designed to have the circuit construction shown in FIGS. 8A and 8B, by operating the bus driver 146 and the data selector 153 appropriately. In this case, the lowpass filter 46 and the switching circuits 16 and 27 may be omitted. In other words, at the time of the recording, the digital line-sequential color difference signal is stored in the RAM 18a by an operation similar to the operation described previously for the time of the recording. In this state, the timing generator 120 is caused to generate a signal which is identical to the signal shown in FIGS. 13(J) and 14(H), and this signal is supplied to the data selector 153. The bi-directional data bus 132 and the latch gate 26a are connected through the data selector 153, only for a duration in which the signal supplied to the data selector 153 assumes a high level. For a duration in which the signal supplied to the data selector 153 assumes a low level, the data bus 154 or 155 which is connected to the RAM 22a or 23a which is performing the read-out operation as described previously for the time of the recording, is connected to the latch gate 26a through the data selector 153. As a result, the time-division-multiplexed signal shown in FIG. 2(B) or FIG. 13(C), can be produced through the output terminal 154. Such an operation is possible because the luminance signal processing system including the RAMs 22a and 23a does not operate for a duration in which the signal shown in FIGS. 13(J) and 14(H) assumes a high level.

In this case, it is not possible to transmit the output D.C. level of the holding amplifier 122, but the color difference signals can be discriminated by the signal shown in FIG. 14(F). In addition, it is also possible use the output signal of the clamping circuit 33 as a discriminating signal, by supplying the output D.C. level of the holding amplifier 122 to the clamping circuit 33.

On the other hand, at the time of the reproduction, the reproduced time-division-multiplexed signal shown in FIGS. 2(B) and 13(C) is supplied to the AD converter 21 through the input terminal 141. The operation of the AD converter 17 is stopped, and the signal shown in FIG. 13(H) is supplied to the bus driver 146 from the timing generator 120. For a duration in which this signal supplied to the bus driver 146 assumes a high level, the bus driver 146 is turned ON to connect the output of the AD converter 21 and the bi-directional data bus 132, so as to write the reproduced time base compressed line-sequential color difference signal in the RAM 18a. On the other hand, for a duration in which the signal shown in FIG. 13(H) assumes a low level, the bus driver 146 is turned OFF, so as to read out the time base expanded line-sequential color difference signal from RAM 18a as described previously. The reproduced line-sequential color difference signal can be obtained in this manner. In this case, the reproduced time base compressed luminance signal can be time base expanded by an operation similar to the operation described previously.

It is obvious that the circuit may be designed to have the circuit construction shown in FIGS. 6A and 6B, or FIGS. 7A and 7B, by appropriately operating the bus driver 146 and the data selector 153.

Figure 16:
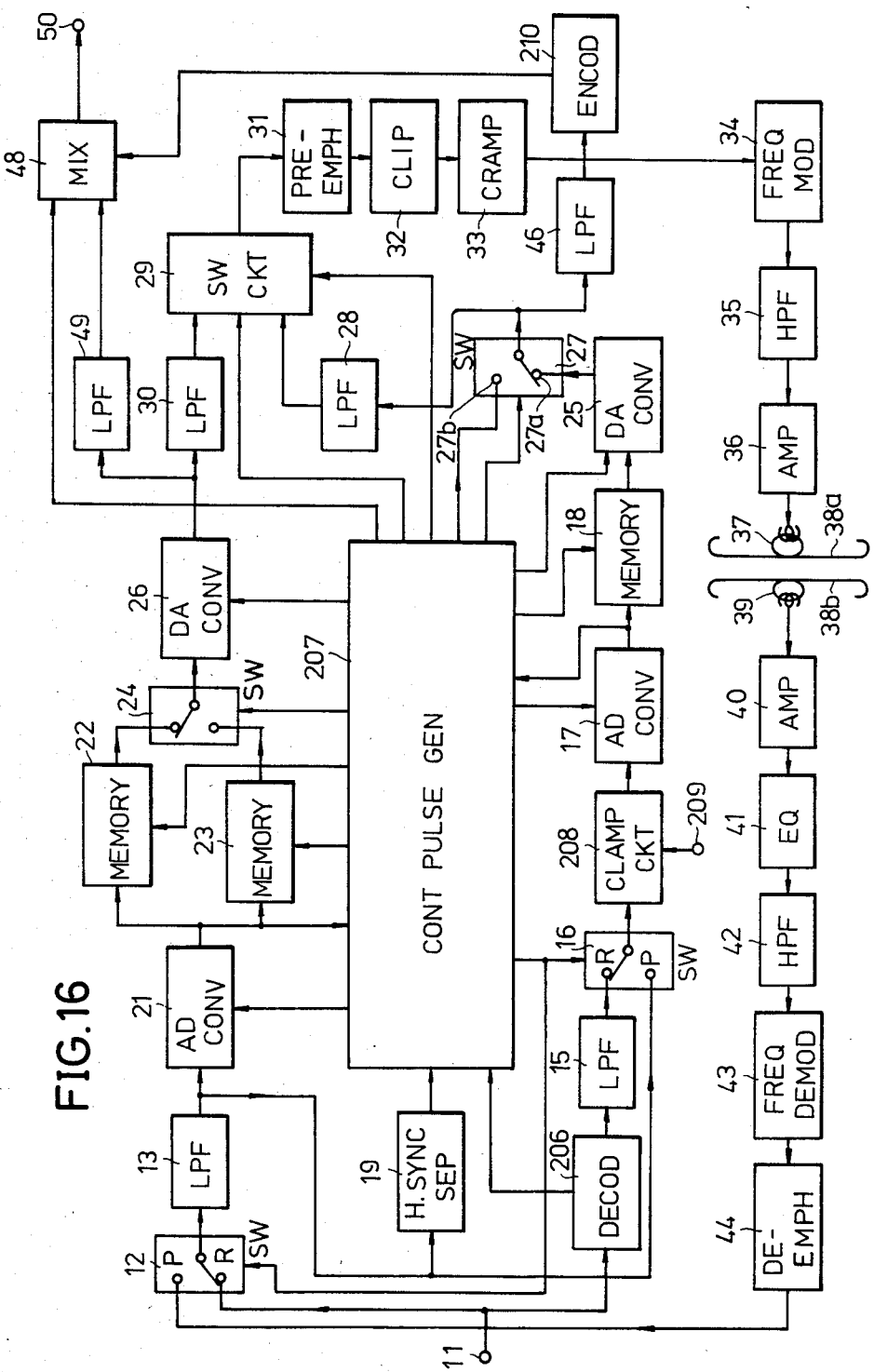
FIG. 16 is a systematic block diagram showing a second embodiment of a color video signal recording and reproducing apparatus according to the present invention.
Figure 17:
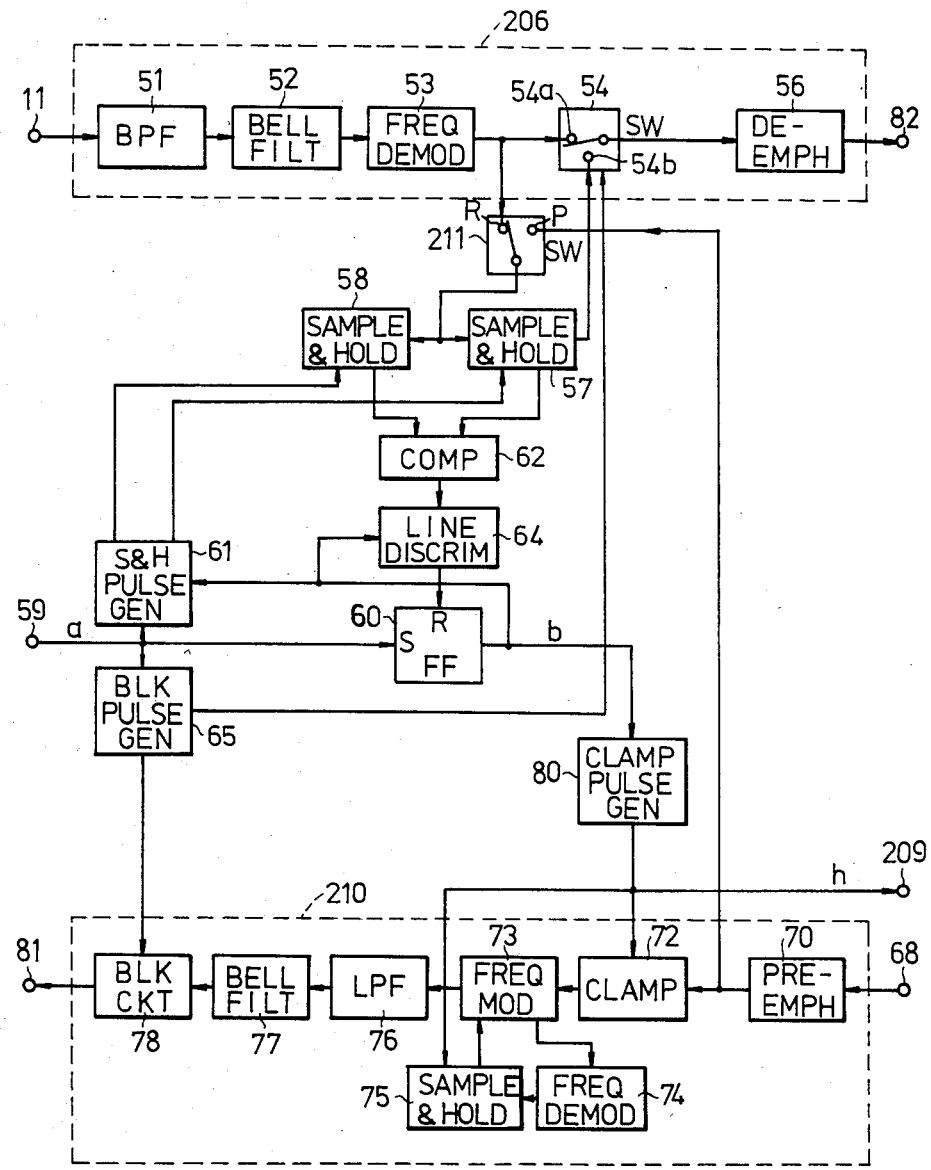
FIG. 17 is a systematic block diagram showing an embodiment of an essential part of the block system shown in FIG. 16.

Next, description will be given with respect to a second embodiment of a color video signal recording and reproducing apparatus according to the present invention, by referring to FIGS. 16 and 17. In FIGS. 16 and 17, those parts which are the same as those corresponding parts in FIGS. 1 and 3 are designated by the same reference numerals, and their description will be omitted. In the present embodiment of the invention, a decoder 206 does not have a D.C. shifting circuit and an encoder 210 does not have a D.C. shifting circuit, as may be seen from FIG. 17. According to the present embodiment, the recording and reproduction is carried out by transmitting the frequency demodulated line-sequential color difference signal with the D.C. level difference between the color difference signals maintained, without performing a D.C. shift with respect to the frequency demodulated line-sequential color difference signal. Accordingly, in the present embodiment, the D.C. level difference is transmitted as a discriminating information for discriminating the color difference signals (R−Y) and (B−Y). Therefore, it is unnecessary to particularly transmit a discriminating signal, and the circuit construction can be simplified compared to the circuit of the first embodiment of the invention described previously.

The color reference level (the D.C. level of the achromatic color part of the color difference signal within the back porch duration described previously) in the time-division-multiplexed signal which is represented by $b_1$ and $b_2$ in FIG. 14(B), differs by the D.C. level difference described previously for every 1 H. In the present embodiment, the line-sequential color difference signal from the decoder 206 or the reproduced time-division-multiplexed signal is supplied to a clamping circuit 208, and the clamping circuit 208 clamps the color reference level of one of the color difference signals (R−Y) and (B−Y) which has been set. A clamping pulse which is supplied to the clamping circuit 208 through a terminal 209, is produced in the following manner.

First, at the time of the recording, a line-sequential color difference signal from the frequency demodulator 53 within the decoder 206 shown in FIG. 17, is supplied to the sample and hold circuits 57 and 58 through a switching circuit 211. The D.C. level which corresponds to the achromatic color part of the line-sequential color difference signal, is alternately sampled and held in the sample and hold circuits 57 and 58 for every 1 H. The comparator 62 compares the levels of sampled and held voltages from the sample and hold circuits 57 and 58. Thereafter, operations similar to those described previously, are performed. As a result, the clamping pulse h shown in FIG. 4(H) is produced from the clamping pulse generating circuit 80 which is supplied with the output signal of the flip-flop 60. As shown in FIG. 4(H), the clamping pulse h has a period of 2 H, and assumes a high level for a duration which corresponds to the achromatic color part of a predetermined one of the color difference signals. This clamping pulse h is supplied to the clamping circuit 208 through the terminal 209.

At the time of the reproduction, the switching circuit 211 is switched over and connected to a terminal P. Thus, the reproduced line-sequential color difference signal from the pre-emphasis circuit 70 within the encoder 210 shown in FIG. 17, is supplied to the sample and hold circuits 57 and 58 which respectively sample and hold the color reference level. Accordingly, by performing operations similar to those at the time of the recording, the clamping pulse h is generated from the clamping pulse generating circuit 80, and is supplied to the clamping circuits 72 and 208. The clamping pulse generating circuit 80 may be used in common for the time of the recording and for the time of the reproduction. In addition, at the time of the recording, the input signal to the sample and hold circuits 57 and 58 may be the output line-sequential color difference signal of the de-emphasis circuit 56. At the time of the reproduction, the input signal to the sample and hold circuits 57 and 58 may be the input reproduced line-sequential color difference signal of the pre-emphasis circuit 70. At the time of the reproduction, the line-sequential color difference signal is reproduced with the D.C. level difference between the achromatic color parts of the color difference signals (R−Y) and (B−Y) maintained to a predetermined value. As a result, it is unnecessary to perform a D.C. shift in the encoder 210, and a carrier chrominance signal in conformance with the SECAM system can be obtained through the output terminal 81 by simply supplying the reproduced line-sequential color difference signal to the frequency modulator 73.

In FIG. 16, a control pulse generating device 207 has a construction which is substantially the same as the construction of the control pulse generating device 20. The only difference is that, the control pulse generating device 207 supplies to the switching circuit 29 a horizontal synchronizing signal in which the discriminating burst signal has not been added.

Figure 18:
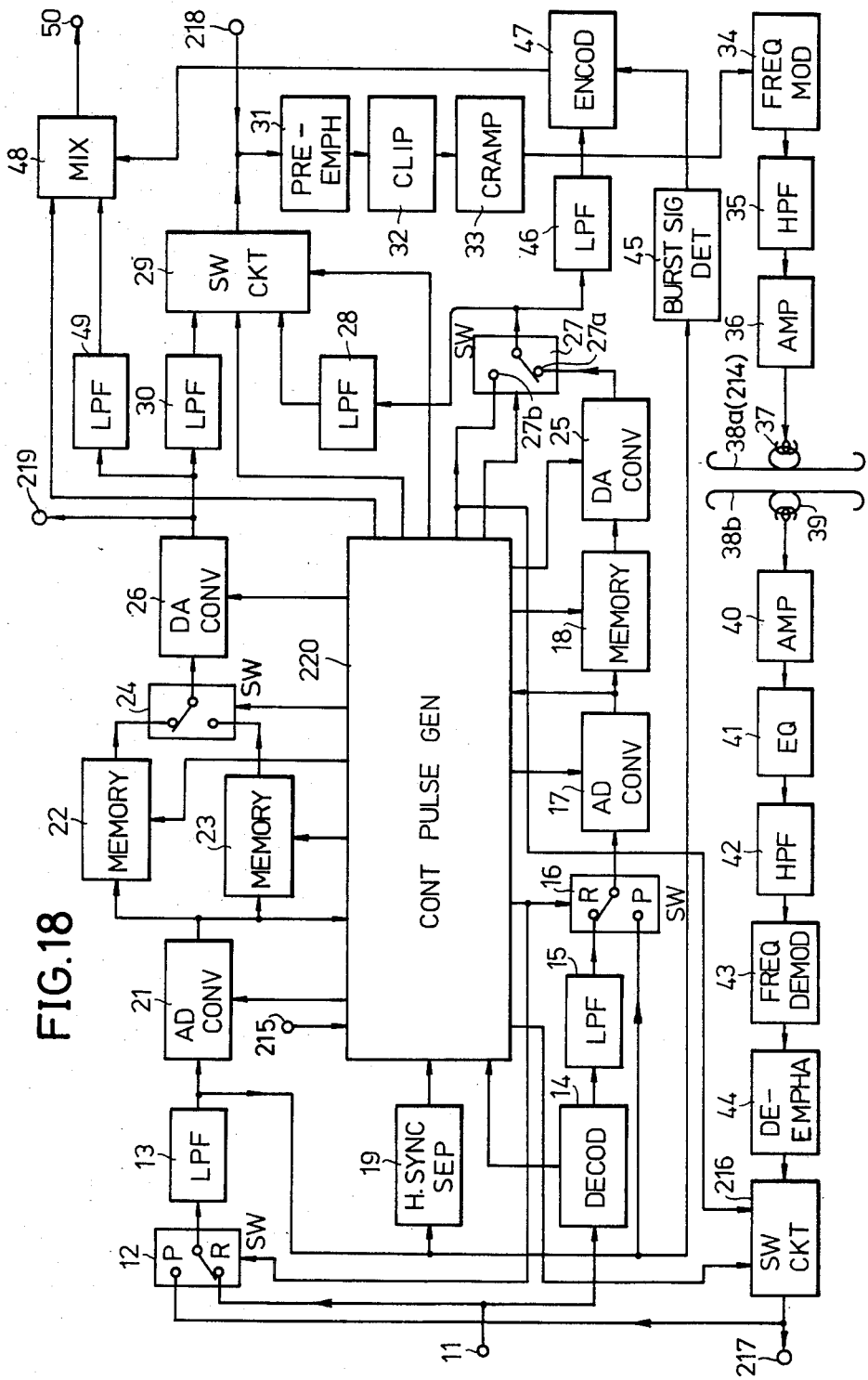
FIG. 18 is a systematic block diagram showing a third embodiment of a color video signal recording and reproducing apparatus according to the present invention, and a modification thereof.

Next, description will be given with respect to a third embodiment of a color video signal recording and reproducing apparatus according to the present invention, by referring to FIG. 18. In FIG. 18, those parts which are the same as those corresponding parts in FIG. 1 are designated by the same reference numerals, and their description will be omitted.

A dubbing apparatus is constituted by parts of two recording and reproducing apparatuses. In other words, the dubbing apparatus is constituted by a part of a reproducing system in one of the recording and reproducing apparatuses, and a part of a recording system in the other of the recording and reproducing apparatuses. However, in FIG. 8, the reproducing system and the recording system of the dubbing apparatus are shown in a single recording and reproducing apparatus for convenience' sake.

First, description will be given with respect to an operation for a case where a recorded signal on the recorded magnetic tape 38b is dubbed onto an unrecorded magnetic tape 214. At the time of the dubbing, a dubbing control signal from an input terminal 215 is applied to a control pulse generating device 220. The control pulse generating device 220 supplies to a switching circuit 216 a signal which has a waveform identical to the waveform of the horizontal synchronizing signal shown in FIG. 14(F), as a switching pulse. As a result, the switching circuit 216 selectively produces the signal shown in FIG. 14(F) which is supplied to the terminal 27b of the switching circuit 27, for a duration in which the switching pulse assumes a high level. The control pulse generating device 220 has a construction which is substantially the same as the construction of the control pulse generating device 20 described previously. The difference is that, when the dubbing control signal is applied to the input terminal 215, the control pulse generating device 220 supplies predetermined clock pulses which will be described later to the time base compressing circuit including the memory circuits 22 and 23.

The recorded signal which is reproduced from the recorded magnetic tape 38b by the reproducing head 39, is supplied to the switching circuit 216, through the reproducing amplifier 40, the equalizer 41, the highpass filter 42, the frequency demodulator 43, and the de-emphasis circuit 44. The horizontal synchronizing signal within the reproduced time-division-multiplexed signal from the de-emphasis circuit 44, has a pulse width which is in the range of 4 μs and narrow as described previously. Thus, the reproduced waveform of the horizontal synchronizing signal will become rounded during the recording and reproducing process of the recording and reproducing apparatus, because the band is limited during the recording and reproducing process. Further, the discriminating burst signal within the reproduced time-division-multiplexed signal will also become deteriorated during the recording and reproducing process.

Thus, the switching circuit 216 replaces the horizontal synchronizing signal (including the veritcal synchronizing signal component) and the discriminating burst signal within the reproduced time-division-multiplexed signal from the de-emphasis circuit 44, by the horizontal synchronizing signal and the discriminating burst signal shown in FIG. 14(F) which are generated from the control pulse generating device 220 and do not contain distortions. As a result, a reproduced time-division-multiplexed signal in which the horizontal synchronizing signal and the discriminating burst signal have been replaced, is obtained from the switching circuit 216. This reproduced time-division-multiplexed signal from the switching circuit 216 is supplied to a dubbing signal input terminal of another recording and reproducing apparatus, through an output terminal 217.

An input terminal 218 shown in FIG. 18 is such a dubbing signal input terminal. The reproduced time-division-multiplexed signal applied to the input terminal 218, is supplied to the recording head 37 through the pre-emphasis circuit 31, the clipping circuit 32, the clamping circuit 33, the frequency modulator 34, the highpass filter 35, and the recording amplifier 36. The signal supplied to the recording head 37, is recorded on the unrecorded magnetic tape 214. Therefore, the recorded signal on the recorded magnetic tape 38b is dubbed onto the unrecorded magnetic tape 214, without being converted into the standard system color video signal. Moreover, because the horizontal synchronizing signal and the discriminating burst signal are replaced by the undistorted horizontal synchronizing signal and the undistorted discriminating burst signal, it is possible to dub a signal of an extremely high quality.

The reproduced time-division-multiplexed signal produced through the output terminal 217, generally includes a deviation in the reproducing time base (jitter) due to a deviation in the relative linear speed between the magnetic tape 38b and the reproducing head 39. In a case where this deviation in the reproducing time base is large, the deviation component of the reproducing time base in the reproducing system will be added when the dubbed time-division-multiplexed signal is reproduced. In this case, the clock pulse generator 126 shown in FIG. 12 which supplies the clock pulses to the circuit which performs the time base expansion, cannot sufficiently follow the deviation in the reproducing time base. Consequently, the luminance signal and the color difference signals may deviate on the reproduced picture, due to the difference between the time base expanding rates with which the time base compressed luminance signal and the time base compressed line-sequential color difference signal are time base expanded, and the like.

Accordingly, in a modification of the third embodiment of the invention, the reproduced time-division-multiplexed signal from the switching circuit 216 is supplied to a time base expanding circuit for the time base compressed luminance signal, through the switching circuit 12 and the lowpass filter 13. The time base expanding circuit for the time base compressed luminance signal, comprises the AD converter 21, the memory circuits 22 and 23, the switching circuit 24, and the DA converting circuit 26. When the dubbing control signal is applied to the input terminal 215, the control pulse generating device 220 generates the clock pulses with a frequency and timing different from those at the time of the time base expansion, and for this reason, the above time base expanding circuit will not perform a time base expansion but will instead eliminate the deviation in the reproducing time base. In other words, the write-in and read-out operations are repeated for every 1 H in the memory circuits 22 and 23, but in this case, the clock pulse generating device 220 generates a write-in clock pulse which includes a time base deviation component which is the same as the time base deviation component of the reproduced time-division-multiplexed signal, and a read-out clock pulse which has a frequency which is the same as the frequency of the write-in clock pulse and does not include a time base deviation component. Thus, a reproduced time-division-multiplexed signal which has been eliminated of the deviation in the reproducing time base, is obtained from the DA converting circuit 26. The reproduced time-division-multiplexed signal from the DA converting circuit 26, is supplied to a dubbing signal input terminal of another recording and reproducing apparatus through an output terminal 219. Similarly as in the case described before, this reproduced time-division-multiplexed signal from the DA converting circuit 26, is passed through the blocks 31 through 36 shown in FIG. 18, and recorded on the unrecorded magnetic tape 214 by the recording head 37.

The recording and reproducing apparatus according to the present invention, can also be applied to the recording and reproduction of the PAL system color video signal and the SECAM system color video signal. However, in the case of these video signals, it is necessary to demodulate the carrier chrominance signal and then convert the demodulated carrier chrominance signal into a line-sequential color difference signal, in the decoders 14 and 206. In addition, it becomes necessary to simultaneously obtain the color difference signals from the reproduced line-sequential color difference signal, in the encoders 47 and 210.

For example, the output signal frequency of the VCO 195 shown in FIG. 12, may be selected to 80 MHz.

In addition, the discrimination to determine whether the time base compressed line-sequential color difference signal within the time-division-multiplexed signal which is to be transmitted corresponds to a section of 1 H of the time base compressed color difference signal $(R-Y)_C$ or a section of 1 H of the time base compressed color difference signal $(B-Y)_C$, is not limited to the use of the burst signal and the D.C. level difference as in the embodiments described heretofore. For example, in order to perform the above discrimination, the pulse width of the horizontal synchronizing signal may be varied, or the pulse width of the horizontal synchronizing signal may be kept constant and the immediately subsequent duration in which the pedestal level is transmitted may be varied. Moreover, the horizontal synchronizing signal at the time of the reproduction may be obtained by time base expanding the horizontal synchronizing signal within the time-division-multiplexed signal.

Further, the present invention is not limited to these embodiments, but various variations and modifications may be made without departing from the scope of the present invention.

What is claimed is:

1. A color video signal recording and reproducing apparatus for recording an analog time-division-multiplexed signal on a recording medium, said time-division-multiplexed signal having a time base compressed luminance signal and a time base compressed line-sequential color difference signal within each horizontal scanning period so that said time base compressed line-sequential color difference signal is time-division-multiplexed with the time base compressed luminance signal, and for reproducing said time-division-multiplexed signal from the recording medium, said reproduced time-division-multiplexed signal being subjected to a time base expansion so as to obtain a reproduced luminance signal and a reproduced line-sequential color difference signal which have been returned to an original time base, said recording and reproducing apparatus comprising:

a first switching circuit for selectively passing, at the time of the recording, a color video signal which is to be recorded and for selectively passing the reproduced time-division-multiplexed signal at the time of the reproduction;

a filter circuit supplied with the output signal of said first switching circuit and having such a passband that a luminance signal within the color video signal which is to be recorded is separated and filtered at the time of the recording and the reproduced time-division-multiplexed signal is passed at the time of the reproduction;

a decoder supplied with the color video signal which is to be recorded for separating and filtering a chrominance signal from the color video signal and for obtaining a line-sequential color difference signal;

a second switching circuit for selectively passing the output line-sequential color difference signal of said decoder at the time of the recording and for selectively passing the output reproduced time-division-multiplexed signal of said filter circuit at the time of the reproduction;

first time base compressing means for subjecting the output luminance signal of said filter circuit to an analog-to-digital conversion and for perfoming a time base compression with respect to the digitally converted luminance signal by use of a first random access memory and a first control pulse generating means so as to produce a first digital time base compressed luminance signal, said first control pulse generating means generating a first control pulse and a second control pulse which has a frequency higher than a frequency of said first control pulse, said digitally converted luminance signal being written into said first random access memory depending on said first control pulse and read out from said first random access memory depending on said second control pulse so as to produce said first digital time base compressed luminance signal;

second time base compressing means for subjecting the output line-sequential color difference signal of said second switching circuit to an analog-to-digital conversion and for performing a time base compression with respect to the digitally converted line-sequential color difference signal by use of a second random access memory and a second control pulse generating means so as to produce a first digital time base compressed line-sequential color difference signal, said second control pulse generating means generating a third control pulse and a fourth control pulse which has a frequency higher than a frequency of said third control pulse, said digitally converted line-sequential color difference signal being written into said second random access memory depending on said third control pulse and read out from said second random access memory depending on said fourth control pulse so as to produce said first digital time base compressed line-sequential color difference signal;

discriminating signal producing means for producing a discriminating signal which is used to discriminate said time base compressed line-sequential color difference signal;

time-division-multiplexed signal producing means for producing said time-division-multiplexed signal by time-division-multiplexing a time base compressed luminance signal and a time base compressed line-sequential color difference signal which are obtained by subjecting the output digital signals of said first and second time base compressing means to a digital-to-analog conversion and said discriminating signal;

recording means for frequency-modulating said time-division-multiplexed signal and for recording the frequency modulated time-division-multiplexed signal on the recording medium;

reproducing means for reproducing the recorded signal from the recording medium and for demodulating the reproduced signal so as to obtain and supply the reproduced time-division-multiplexed signal to said first swtiching circuit;

first time base expanding means for performing a time base expansion which compensates the time base compression in said first time base compressing means, with respect to a second digital time base compressed luminance signal which has been obtained by subjecting said reproduced time-division-multiplexed signal from said filter circuit to an analog-to-digital conversion, by use of said first random access memory and said first control pulse generating means so as to obtain the reproduced digital luminance signal, said second digital time base compressed luminance signal being written into said fist random access memory depending on said second control pulse and read out from said first random access memory depending on said first control pulse so as to obtain said reproduced digital luminance signal;

second time base expanding means for performing a time base expansion which compensates the time base compression in said second time base compressing means, with respect to a second digital time base compressed line-sequential color difference signal which has been obtained by subjecting the output reproduced time-division-multiplexed signal of said second switching circuit to an analog-to-digital conversion, by use of said second random access memory and said second control pulse generating means so as to obtain the reproduced digital line-sequential color difference signal, said second digital time base compressed line-sequential color difference signal being written into said second random access memory depending on said fourth control pulse and read out from said second random access memory depending on said third control pulse so as to obtain said reproduced digital line-sequential color difference signal; and digital-to-analog conversion circuit means for digital-to-analog converting said reproduced digital luminance signal and said reproduced digital line-sequential color difference signal to obtain a reproduced analog luminance signal and a reproduced analog line-sequential color difference signal.

2. A recording and reproducing apparatus as claimed in claim 1 which further comprises an encoder supplied with said reproduced line-sequential color difference signal and said discriminating signal within said reproduced time-division-multiplexed signal, for producing a reproduced chrominance signal which is in conformance with a desired standard system, and a mixing circuit for mixing said reproduced luminance signal and said reproduced chrominance signal from said encoder, so as to produce a reproduced color video signal.

3. A recording and reproducing apparatus as claimed in claim 1 in which said discriminating signal has a single frequency, and is frequency-division-multiplexed in a specific duration of said time base compressed line-sequential color difference signal with a period of two horizontal scanning periods.

4. A recording and reproducing apparatus as claimed in claim 1 in which said discriminating signal is a D.C. level component within said time base compressed line-sequential color difference signal and has a period of two horizontal scanning periods.

5. A recording and reproducing apparatus as claimed in claim 1 in which said color video signal is a SECAM system color video signal, and said second time base compressing means comprises sample and hold means for sampling and holding a D.C. level of an achromatic color part in a line-sequential color difference signal which is obtained by demodulating a SECAM system chrominance signal, and means for adding a D.C. level from said sample and hold means immediately before said first digital time base compressed line-sequential color difference signal.

6. A recording and reproducing apparatus as claimed in claim 1 in which said color video signal is a SECAM system color video signal, and said second time base compressing means performs the time base compression directly with respect to a line-sequential color difference signal which is obtained by demodulating a SECAM system chrominance signal.

7. A recording and reproducing apparatus as claimed in claim 1 in which said time-division-multiplexed signal producing means comprises switching means for alternately supplying the output digital signals of said first and second time base compressing means to a single digital-to-analog converter within a duration of one horizontal scanning period, so that the output digital signals of said first and second time base compressing means are subjected to a digital-to-analog conversion.

8. A recording and reproducing apparatus as claimed in claim 1 in which said second digital time base compressed luminance signal and said second digital time base compressed line-sequential color difference signal are obtained by passing said reproduced time-division-multiplexed signal through a single analog-to-digital converter, and said recording and reproducing apparatus further comprises transmission path switching means for switching a transmission path so that said second digital time base compressed luminance signal is supplied to said first random access memory of said first time base expanding means, and said second digital time base compressed line-sequential color difference signal is supplied to said second random access memory of said second time base expanding means.

9. A recording and reproducing apparatus as claimed in claim 1 which further comprises a dubbing signal input terminal provided in an input stage of said recording means for receiving a time-division-multiplexed signal which is to be dubbed, producing means for producing a discriminating signal which is used to discriminate the first digital time base compressed line-sequential color difference signal and a horizontal synchronizing signal within the time base compressed luminance signal, switching circuit means supplied with the discriminating signal and the horizontal synchronizing signal from said producing means, for replacing a reproduced horizontal synchronizing signal and a reproduced discriminating signal within the reproduced time-division-multiplexed signal by the discriminating signal and the horizontal synchronizing signal which are obtained from said producing means, and an output terminal for producing an output signal of said switching circuit means as said time-division-mutiplexed signal which is to be dubbed.

10. A recording and reproducing apparatus as claimed in claim 9 which further comprises a pulse generating device for supplying to said first random access memory of said first time base expanding means at the time of the dubbing a first clock pulse which includes a time base deviation which is the same as the time base deviation in the output time-division-multiplexed signal of said switching circuit means and a second clock pulse which has a repetition frequency which is the same as the repetition frequency of said first clock pulse and does not include a time base deviation, and said output time-division-multiplexed signal of said switching circuit means is written in said first random access memory of said first time base expanding means based on said first clockpulse and then read out from the random access memory of said first time base expanding means based on said second clock pulse.

* * * * *